US010984545B2

(12) United States Patent
Gu et al.

(10) Patent No.: US 10,984,545 B2
(45) Date of Patent: Apr. 20, 2021

(54) ESTIMATING DEPTH FOR A VIDEO STREAM CAPTURED WITH A MONOCULAR RGB CAMERA

(71) Applicant: NVIDIA Corporation, Santa Clara, CA (US)

(72) Inventors: Jinwei Gu, San Jose, CA (US); Kihwan Kim, Campbell, CA (US); Chao Liu, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 167 days.

(21) Appl. No.: 16/439,539

(22) Filed: Jun. 12, 2019

(65) Prior Publication Data

US 2020/0160546 A1 May 21, 2020

Related U.S. Application Data

(60) Provisional application No. 62/768,591, filed on Nov. 16, 2018.

(51) Int. Cl.
*G06T 7/55* (2017.01)
*G06T 3/00* (2006.01)
(Continued)

(52) U.S. Cl.
CPC ............. *G06T 7/55* (2017.01); *G06N 3/0454* (2013.01); *G06N 3/08* (2013.01); *G06N 20/10* (2019.01);
(Continued)

(58) Field of Classification Search
CPC ...... G06N 20/10; G06N 20/20; G06N 3/0454; G06N 3/08; G06T 2207/10028;
(Continued)

(56) References Cited

U.S. PATENT DOCUMENTS

2002/0094028 A1* 7/2002 Kimoto ................ H04N 19/124
375/240.14

OTHER PUBLICATIONS

Barron, J.T., et al., "The fast bilateral solver," in European Conference on Computer Vision (ECCV) (2016).
(Continued)

*Primary Examiner* — Manuchehr Rahmjoo
(74) *Attorney, Agent, or Firm* — Leydig, Voit & Mayer, Ltd.

(57) ABSTRACT

Techniques for estimating depth for a video stream captured by a monocular image sensor are disclosed. A sequence of image frames are captured by the monocular image sensor. A first neural network is configured to process at least a portion of the sequence of image frames to generate a depth probability volume. The depth probability volume includes a plurality of probability maps corresponding to a number of discrete depth candidate locations over a range of depths defined for the scene. The depth probability volume can be updated using a second neural network that is configured to generate adaptive gain parameters to integrate the DPVs over time. A third neural network is configured to refine the updated depth probability volume from a lower resolution to a higher resolution that matches the original resolution of the sequence of image frames. A depth map can be calculated based on the depth probability volume.

20 Claims, 19 Drawing Sheets

(51) Int. Cl.
G06N 3/04 (2006.01)
G06N 3/08 (2006.01)
G06N 20/10 (2019.01)
H04N 5/232 (2006.01)
G06N 20/20 (2019.01)

(52) U.S. Cl.
CPC ............ *G06N 20/20* (2019.01); *G06T 3/0093* (2013.01); *H04N 5/23258* (2013.01); *G06T 2207/10028* (2013.01); *G06T 2207/20084* (2013.01); *G06T 2207/20224* (2013.01)

(58) Field of Classification Search
CPC . G06T 2207/20084; G06T 2207/20224; G06T 3/0093; G06T 7/55; H04N 2013/0081; H04N 5/23258
See application file for complete search history.

(56) References Cited

OTHER PUBLICATIONS

Bishop, C.M., et al., "Mixture density networks," Neural Computing Research Group, Feb. 1994; available at: www.ncrg.aston.ac.uk.
Bloesch, M., et al., "CodeSLAM—learning a compact, optimizable representation for dense visual SLAM," in IEEE Conference on Computer Vision and Pattern Recognition (CVPR) (2018).
Chan, D., et al., "A Noise-Aware Filter for Real-Time Depth Upsampling," In Workshop on Multi-camera and Multi-modal Sensor Fusion Algorithms and Applications—M2SFA2 2008, Marseille, France, 2008.
Chang, J.R., et al., "Pyramid stereo matching network," In IEEE Conference on Computer Vision and Pattern Recognition (CVPR), pp. 5410-5418 (2018).
Christian, J.A., et al., "A survey of LIDAR technology and its use in spacecraft relative navigation," In AIAA Guidance, Navigation and Control (GNC) (2013).
Clark, R., et al., "VidLoc: a deep spatial-temporal model for 6-DoF video-clip relocalization," In IEEE Conference on Computer Vision and Pattern Recognition (CVPR) (2017).
Criminisi, A., et al., "Single view metrology," International Journal of Computer Vision (IJCV) (2000).
Dai, A., et al., "Richly-annotated 3D reconstructions of indoor scenes," In IEEE Conference on Computer Vision and Pattern Recognition (CVPR) (2017).
Eigen, D., et al., "Depth map prediction from a single image using a multi-scale deep network," In Advances in Neural Information Processing Systems (NIPS) (2014).
Engel, J., et al., "Direct sparse odometry," IEEE Transactions on Pattern Analysis and Machine Intelligence (TPAMI); 40:611-625, 2018.
Fu, H., et al., "Deep ordinal regression network for monocular depth estimation," In IEEE Conference on Computer Vision and Pattern Recognition (CVPR) (2018).
Gaidon, A., et al., "Virtual worlds as proxy for multi-object tracking analysis," In IEEE Conference on Computer Vision and Pattern Recognition (CVPR) (2016).
Gal, Y., et al., "Dropout as a Bayesian approximation: Representing model uncertainty in deep learning," In International Conference on Machine Learning (ICML) (2016).
Geiger, A., et al., "Are we ready for autonomous driving? The kitti vision benchmark suite," In IEEE Conference on Computer Vision and Pattern Recognition (CVPR), pp. 3354-3361 (2012).
Godard, C. et al., "Unsupervised monocular depth estimation with left-right consistency," In IEEE Conference on Computer Vision and Pattern Recognition (CVPR) (2017).
Gupta, S., et al., "Learning rich features from RGB-D images for object detection and segmentation," In European Conference on Computer Vision (ECCV) (2014).

Horaud, R., et al., "An overview of Depth Cameras and Range Scanners Based on Time-of-Flight Technologies," Machine Vision and Applications Journal, 27 (7): 1005-1020 (2016).
Huang, P.H., et al., "DeepMVS: Learning multi-view stereopsis," In IEEE Conference on Computer Vision and Pattern Recognition (CVPR) (2018).
Ilg, E., et al., "Uncertainty estimates and mujlti-hypotheses networks for optical flow," In European Conference on Computer Vision (ECCV) (2018).
Kamberova, G., et al., "Sensor errors and the uncertainties in stereo reconstruction," in Empirical Evaluation Techniques in Computer Vision, pp. 96-116; IEEE Computer Society Press (1998).
Kendall, A., et al., "What uncertainties do we need in Bayesian deep learning for computer vision?" In Advances in Neural Information Processing Systems (NIPS) (2017).
Kendall, A., et al., "Multi-task learning using uncertainty to weigh losses for scene geometry and semantics," In IEEE Conference on Computer Vision and Pattern Recognition (CVPR) (2018).
Kim, K., et al., "Gaussian process regression flow for analysis of motion trajectories," In International Conference on Computer Vision (ICCV) (2011).
Kingma, D.P., et al., "A method for stochastic optimization," In International Conference on Learning Representations (ICLR) (2015).
Lai, W.S., et al., "Learning blind video temporal consistency," In European Conference on Computer Vision (ECCV) (2018).
Mahjourian, R., et al., "Unsupervised learning of depth and ego-motion from monocular video using 3d geometric constraints," arXiv Preprint arXic:1802.05522 (2018).
Maimone, A., et al., "Reducing interference between multiple structured light depth sensors using motion," In 2012 IEEE Virtual Reality Workshops (VRW), pp. 51-54 (2012).
McCormac, J., et al., "SceneNet RGB-D: Can 5m synthetic images beat generic imagenet pre-training on indoor segmentation?" In International Conference on Computer Vision (ICCV) (2017).
Mur-Artal, R., et al., "ORB-SLAM2: an open source SLAM system for monocular, stereo and RGB-D cameras," IEEE Transactions on Robotics, 33(5):1255-1262 (2017).
Silberman, P.K., et al., "Indoor segmentation and support inference from RGBD images," in European Conference on Computer Vision (ECCV) (2012).
Newcombe, R.A., et al., "KinectFusion: real-time dense surface mapping and tracking," In IEEE and ACM International Symposium on Mixed Augmented Reality (ISMAR), pp. 127-136 (2011).
Nießner, M., et al., "Real-time 3d reconstruction at scale using voxel hashing," ACM Transactions on Graphics (TOG) (2013).
Pomerleau, F., et al., "Noise characterization of depth sensors for surface inspections," In 2012 International Conference on Applied Robotics for the Power Industry (CARPI), pp. 16-21 (2012).
Qi, C.R., et al., "Frustum pointnets for 3d object detection from rgb-d data," In IEEE Conference on Computer Vision and Pattern Recognition (CVPR) (2017).
Remondino, F., et al., "TOF Range-Imaging Cameras," Springer Publishing Company, Incorporated (2013).
Reynolds, M., et al., "Capturing time-of-flight data with confidence," In IEEE Conference on Computer Vision and Pattern Recognition (CVPR) (2011).
Saxena, A., et al., "3d depth reconstruction from a single still image," International Journal of Computer Vision (IJCV) 76(1):53-69, Jan. 2008.
Saxena, A., et al., "Depth estimation using monocular and stereo cues," In Proceedings of the 20th International Joint Conference on Artificial Intelligence, IJCAI'07, pp. 2197-2203 (2007).
Schonberger, J.L., et al., "Structure-from-motion revisited," In Conference on Computer Vision and Pattern Recognition (CVPR) (2016).
Schonberger, J.L., et al., "Pixelwise view selection for unstructured multi-view stereo," In European Conference on Computer Vision (ECCV) (2016).
Seitz, S.M., et al., "A comparison and evaluation of multi-view stereo reconstruction algorithms," In Proceedings of the 2006 IEEE Computer Society Conference on Computer Vision and Pattern Recognition—vol. 1, CVPR '06, pp. 519-518 (2006).

(56) References Cited

OTHER PUBLICATIONS

Shotton, J., et al., "Scene coordinate regression forests for camera relocalization in rgb-d images," in IEEE Conference on Computer Vision and Pattern Recognition (CVPR) (2013).
Song, S., et al., "SUN RGB-D: A RGB-D scene understanding benchmark suite," In IEEE Conference on Computer Vision and Pattern Recognition (CVPR) (2015).
Sturm, J., et al., "A benchmark for the evaluation of RGB-D SLAM systems," In IEEE/RSJ International Conference on Intelligent Robots and Systems (IROS) (2012).
Szeliski, R., "Beyesian modeling of uncertainty in low-level vision," International Journal of Computer Vision, 5(3):271-301, Dec. 1990.
Tateno, K., et al., "CNN-SLAM: Real-time dense monocular SLAM with learned depth prediction," in IEEE Conference on Computer Vision and Pattern Recognition (CVPR) (2017).
Tippetts, B., et al., "Review of stereo vision algorithms and their suitability for resource-limited systems," J. Real-Time Image Process, 11(1):5-25, Jan. 2016.
Triggs, B., et al., "Bundle adjustment a modern synthesis," In International Conference on Computer Vision (ICCV) (1999).
Tuley, J., et al., "Analysis and removal of artifacts in 3-d LIDAR data," In International Conference on Robotics and Automation (ICRA) (2005).
Ummenhofer, B., et al., "DeMoN: depth and motion network for learning monocular stereo," In IEEE Conference on Computer Vision and Pattern Recognition (CVPR) (2017).
Wang, C., et al., "Learning depth from monocular videos using direct methods," In IEEE Conference on Computer Vision and Pattern Recognition (CVPR) (2018).
Whelan, T., et al., "ElasticFusion: dense SLAM without a pose graph," In Robotics: Science and Systems (RSS) (2015).
Yao, Y., et al., "MVSNet: Depth inference for unstructures multi-view stereo," In European Conference on Computer Vision (ECCV) (2018).
Yin, Z., et al., "Geonet: Unsupervised learning of dense depth, optical flow and camera pose," arXiv preprint arXiv:1803.02276 (2018).
Zhou, H., et al., "DeepTAM: Deep tracking and mapping," In European Conference on Computer Vision (ECCV) (2018).
Zhou, T., et al., Unsupervised learning of depth and ego-motion from video, In IEEE Conference on Computer Vision and Pattern Recognition (CVPR) (2017).

\* cited by examiner

ESTIMATING DEPTH FOR A VIDEO STREAM CAPTURED WITH A MONOCULAR RGB CAMERA

CLAIM OF PRIORITY

This application claims the benefit of U.S. Provisional Application No. 62/768,591 titled "INVERSE RENDERING, DEPTH SENSING, AND ESTIMATION OF 3D LAYOUT AND OBJECTS FROM A SINGLE IMAGE," filed Nov. 16, 2018, the entire contents of which is incorporated herein by reference.

TECHNICAL FIELD

The present disclosure relates to image and video processing and analysis, and, more specifically, to estimating depth from a sequence of image frames.

BACKGROUND

Understanding depth information related to a scene represented in an image is crucial for three-dimensional (3D) reconstruction. Active techniques for measuring depth information associated with an image provide dense measurements, but can often suffer from limitations such as restricted operating ranges, low spatial resolution, sensor accuracy, and high power consumption. In addition, the active sensors used to measure depth information can be expensive and complicated to set up in order to accurately capture the depth information corresponding to an image captured with a related image sensor.

Basic deep-learning based techniques for estimating depth information from a single monocular image or a stereo image pair have been explored within the prior art. However, the results of these techniques have low accuracy and are unstable temporally when applied to a series of related images captured in a video stream. Furthermore, many of these techniques are not stable across multiple domains and only provide adequate results when the deep-learning neural network is trained for a specific domain (e.g., indoors vs. outdoors). Thus, there is a need for addressing these issues and/or other issues associated with the prior art.

SUMMARY

A system and method are disclosed for estimating depth from image frames captured with a monocular image sensor (e.g., RGB). The technique involves generating, using a deep-learning neural network, an estimate for a depth probability distribution volume (DPV) associated with the image. Rather than associating a pixel in the image with a single depth estimate and confidence value, the DPV associates a pixel or subset of pixels of the image with a set of depth candidates and corresponding confidence values. In other words, the neural network predicts a continuous probability distribution over the depth of the scene for each pixel or subset of pixels, discretely sampled at various depths referred to as candidate depth values.

A method, computer readable medium, and system are disclosed for estimating depth. In one embodiment, a method includes the steps of receiving a sequence of input image data including image frames of a scene. A reference frame and at least one source frame included in the sequence of input image data within a window associated with the reference frame are processed using layers of a first neural network to extract corresponding features for the reference and source frame(s). A measured DPV is generated for the reference frame by warping the extracted features from the source frame to the reference frame for each candidate depth and matching the warped source frame features with the reference frame features. A depth map and a confidence map are generated based on the measured DPV. In an embodiment, the measured DPV consists of a set of two-dimensional arrays of probability values for each of a plurality of candidate depth values.

In an embodiment, the warp function applied to the source frame features is based on relative camera pose information related to a difference between a first position of the image sensor associated with the reference frame and a second position of the image sensor associated with the particular source frame. Generating the measured DPV includes applying a softmax function to a sum of differences between features from the reference frame and warped features from each of the neighboring source frames.

In an embodiment, the method further includes the step of processing a second reference frame and at least one source frame included in the sequence of input image data within a second window associated with the second reference frame using layers of the first neural network to extract features for the second reference frame and the at least one source frame within the second window. The steps also include generating a measured DPV for the second reference frame based on the features for the second reference frame and warped versions of the features for the at least one source frame within the second window, generating a predicted DPV for the second reference frame by applying a warp function to the measured DPV for the first reference frame, and generating an updated DPV for the second reference frame based on the predicted DPV and the measured DPV for the second reference frame.

In some embodiments, generating the updated DPV for the second reference frame includes multiplying the predicted DPV for the second reference frame by a weight to generate a weighted predicted DPV and combining the weighted predicted DPV with the measured DPV for the second reference frame. In some embodiments, generating the updated DPV for the second reference frame includes processing a difference between the predicted DPV and the measured DPV for the second reference frame using layers of a second neural network to generate a residual gain volume and summing the residual gain volume with the predicted DPV to generate the updated DPV.

In an embodiment, the method further includes a step for refining the updated DPV by processing the updated DPV for the second reference frame using layers of a third neural network to generate a refined DPV for the second reference frame. The depth map and the confidence map are calculated based on the refined DPV.

In an embodiment, a system is disclosed for estimating depth based on a sequence of image data. The system includes a memory and at least one processor communicatively coupled to the memory. The memory stores a sequence of input image data including image frames. The at least one processor is configured to process a reference frame and at least one source frame included in the sequence of input image data within a window associated with the reference frame using layers of a first neural network to extract features for the reference frame and the at least one source frame within the window. The at least one processor is further configured to generate a measured DPV for the reference frame based on the features for the reference frame and warped versions of the features for the at least one source frame and generate a depth map and a confidence map based on the measured DPV. The measured DPV includes a 2D array of probability values for each of a plurality of candidate depth values.

In an embodiment, the system further includes an image sensor configured to capture the sequence of input image data. In an embodiment, the system also includes a positional sensing subsystem configured to generate the relative camera pose information. In some embodiments, the positional sensing subsystem includes an inertial measurement unit.

In an embodiment, a non-transitory computer-readable media is disclosed that stores computer instructions for estimating depth. The instructions, when executed by one or more processors, cause the one or more processors to perform the steps of receiving a sequence of input image data including image frames of a scene; processing a reference frame and at least one source frame included in the sequence of input image data within a window associated with the reference frame using layers of a first neural network to extract features for the reference frame and the at least one source frame within the window; generating a measured DPV for the reference frame based on the features for the reference frame and warped versions of the features for the at least one source frame; and generating a depth map and a confidence map based on the measured DPV. In an embodiment, the measured DPV includes a 2D array of probability values for each of a plurality of candidate depth values associated with the reference frame. Each element of the 2D array indicates a probability that a particular pixel or subset of pixels of the reference frame is based on an object located at the corresponding candidate depth value in the scene.

DETAILED DESCRIPTION

Figure 1:
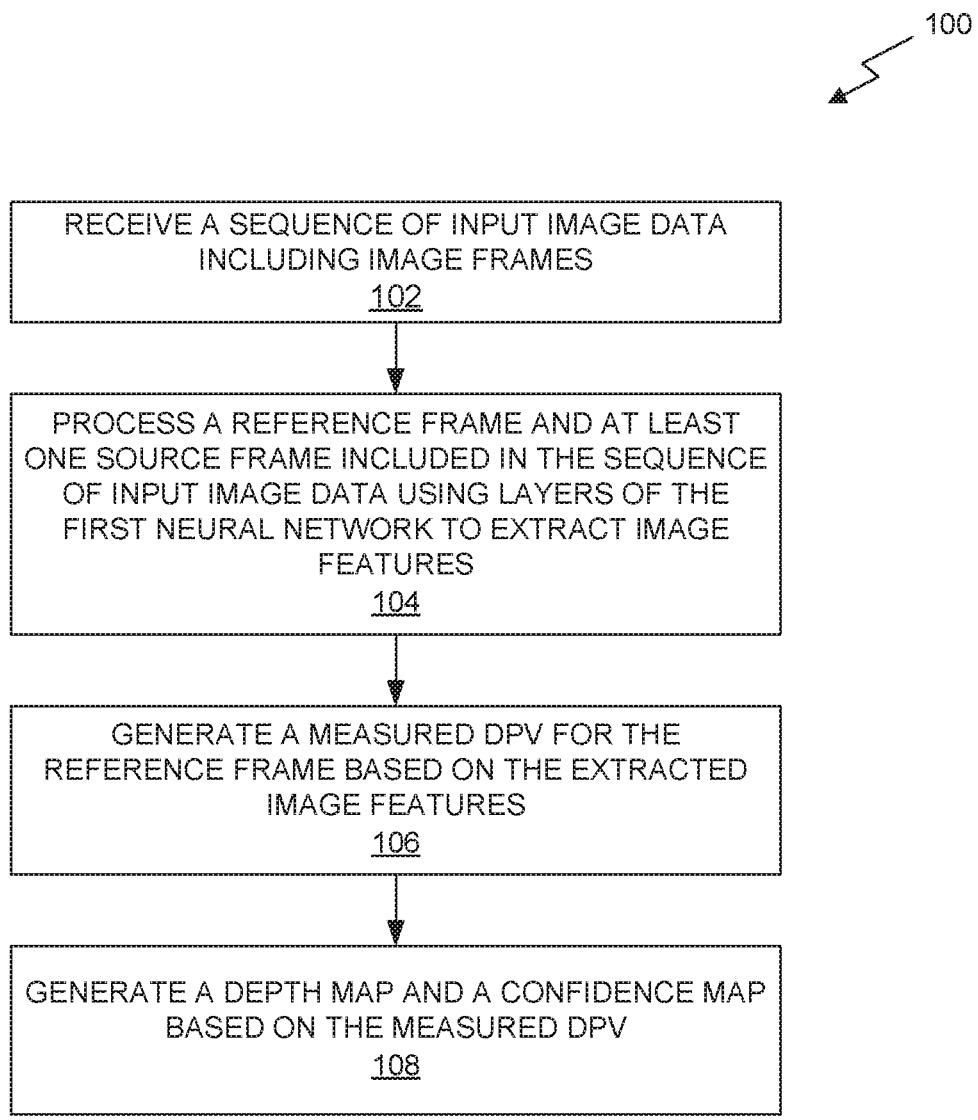
FIG. 1 illustrates a flowchart of a method for estimating depth using a sequence of image frames from a monocular image sensor, in accordance with an embodiment.

The techniques described herein utilizing neural networks to estimate depth information from a sequence of images captured using a monocular image sensor. The depth information is estimated by filtering results from the neural network over a number of frames included in a sliding window associated with the sequence of images. A neural network is utilized to continuously estimate depth and its uncertainty from video streams received from a monocular image sensor to provide accurate, robust, and temporally-stable depth probability distributions for the video stream frames.

The system is composed of three neural network modules: D-Net, K-Net, and R-Net. The negative log-likelihood (NLL) loss over the depth is used to train the entire network in end-to-end fashion. The first neural network module, D-Net, can be used to extract image features from a single image frame. The extracted image features can be used to directly estimate a DPV for the image frame corresponding to a non-parametric volume represented by a frustum composed of voxels originating at the image sensor. However, improved confidence in the estimate can be realized by combining the extracted features for a reference frame and corresponding extracted features for at least one source frame neighboring the reference frame, the features of each source frame warped by a warping function to match intrinsic parameters of the reference frame. The extracted features for the reference frame and the warped features for the at least one source frame are filtered using a softmax function to generate a measured DPV for the reference frame that is based on a plurality of image frames within a time interval rather than a single image frame (or a stereo image frame) captured at a particular instant in time.

The second neural network module, K-Net, integrates a predicted DPV over time to increase the temporal stability of the system. The measured DPV for the current frame is compared to a predicted DPV, which is a warped version of the measured DPV from a previous frame, where the residual signal from the comparison is processed by the layers of the second neural network to generate a residual gain volume that is element-wise accumulated with the predicted DPV across different frames as new observations arrive to generate an updated DPV. Effects of propagation of depth errors from frame-to-frame may be accounted for and mitigated using this adaptive damping technique.

In some embodiments, the second neural network can be omitted from the system and a global damping technique or no damping can be utilized to generate the updated DPV. With no damping, the predicted DPV and the measured DPV are combined without any relative weighting. Consequently, incorrect information estimated by the first neural network in the measured DPV can propagate from frame to frame through the predicted DPV. With global damping, a weight is applied to the predicted DPV when being combined with the measured DPV to reduce the effect of propagation of incorrect information from frame to frame.

The third neural network, R-Net, refines the updated DPV based on the features extracted from the reference frame by the first neural network to up-sample the updated DPV to match an original resolution of the sequence of image frames. In some embodiments, the third neural network can be omitted where, for example, the features extracted by the first neural network are generated at the same resolution, in the pixel space, as the sequence of image frames or where the updated DPV is converted into a depth map at the lower resolution.

The neural network modules may be implemented, at least in part, by a GPU, CPU, or any processor capable of implementing one or more components of the neural networks. In an embodiment, each neural network can be implemented, at least in part, on a parallel processing unit. For example, a convolution layer can be implemented as a series of instructions executed on the parallel processing unit, where calculations for different elements of a feature map are calculated in parallel.

It will be appreciated that the techniques, described in more detail below, are useful for improving the accuracy and temporal stability of depth estimation from image frames captured using a monocular image sensor. The applications for utilizing the depth information are varied but can include robotics, autonomous driving, and 3D model generation.

FIG. 1 illustrates a flowchart of a method for estimating depth using a sequence of image frames from a monocular image sensor, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of estimating depth using a sequence of image frames. Furthermore, persons of ordinary skill in the art will understand that any system that performs method 100 is within the scope and spirit of embodiments of the present disclosure.

At step 102, a sequence of image data is received. In one embodiment, the sequence of image data includes a plurality of image frames captured by a monocular image sensor over a period of time. Each image frame in the sequence of image data is captured at a discrete time in the period of time. A sliding window can be defined within the period of time that is associated with a number of image frames (e.g., five image frames) in the plurality of image frames.

In one embodiment, the monocular image sensor can be configured to sample image sensor sites to identify intensity values for a particular pixel associated with one or more channels of the image. The image sensor is configured to store pixel data for the image frame in a data structure in a memory. The data structure is configured to store pixel data for a 2D array of pixels for each channel of the image frame. In one embodiment, the pixel data comprises pixel values including three components: a red component, a green component, and a blue component. Data structures for multiple image frames in the sequence of input image data are stored in the memory and accessible by a processor.

At step 104, a reference frame and at least one source frame included in a sliding window associated with the sequence of image data are processed by layers of a first neural network to extract features for the reference frame and the at least one source frame. In an embodiment, the reference frame is centered in the sliding window and at least one source frame is included within the sliding window preceding and/or subsequent to the reference frame. The extracted features contain an estimate of the complete statistical distribution of depth for a given scene captured by each image frame.

In an embodiment, the attributes of the first neural network (e.g., weights and/or bias values) are adjusted, during training, based on a loss function that compares the extracted features generated by the first neural network and the ground-truth target features included in the set of training data. The set of training data trains the neural network to more accurately estimate depth probability distributions based on the features of the image frame.

At step 106, a measured DPV is generated for the reference frame based on extracted features for the reference frame and the extracted features for the at least one source frame. In one embodiment, the first neural network is trained to extract features from a single RGB image using a set of training data including computer-generated images and corresponding ground-truth features maps. In addition, features extracted by the first neural network for the at least one source frame are warped to match a representation of the features for the reference frame, and then the features for the reference frame are combined with the warped features for the at least one source frame to generate a measured DPV for the reference frame. In an embodiment, the combination includes estimating the Euclidean distance between the features of the reference frame and the warped features of each of the source frames and applying a softmax function along the depth dimension to a sum of the differences over all source frames in the sliding window.

In one embodiment, a DPV includes a set of 2D arrays of probability values. Each 2D array in the set includes the probability values for a particular candidate depth value of a plurality of candidate depth values associated with the image frame. Each element of the 2D array indicates a probability that a particular pixel or subset of pixels of the image frame is based on an object located at the corresponding candidate depth value in the scene. In other words, the DPV includes a plurality of channels, each channel comprising a 2D array of probability values corresponding to a particular depth candidate value.

As used herein, the term "measured DPV" refers to a DPV calculated based on a plurality of features associated with image frames included in the sliding window. The measured DPV corresponds to a period of time over which multiple image frames are captured by the image sensor, even though the measured DPV is only associated with a key reference frame within the sliding window.

At step 108, a depth map and a confidence map are generated based on the measured DPV. In some embodiments, the depth map and confidence map can be generated based on the measured DPV directly. In other embodiments, the depth map and confidence map can be generated based on the measured DPV indirectly, such as calculating the depth map and/or confidence map directly using a different DPV that is derived from the measured DPV, such as an updated or refined version of the measured DPV.

In an embodiment, the measured DPV can be referred to, notionally, as:

$$p(d; u, v),  \quad (\text{Eq. 1})$$

where d represents a depth candidate in the range of $d \in [d_{min}, d_{max}]$, and $\langle u, v \rangle$ represent the pixel coordinates in the reference frame. Due to perspective projection associated with capturing image frames with a monocular image sensor combined with optical components such as a lens, the measured DPV is defined on a view frustum attached, virtually, to the image sensor at a position at a point in time corresponding to the capture of the reference frame. The parameters $d_{min}$ and $d_{max}$ are the near and far clipping planes of the frustum.

Given the measured DPV, a Maximum-Likelihood Estimate (MLE) for depth and confidence can be computed as follows:

$$\hat{d}(u, v) = \Sigma_{d_{min}}^{d_{max}} p(d; u, v) \cdot d \quad (\text{Eq. 2})$$

$$\hat{C}(u, v) = p(\hat{d}; u, v) \quad (\text{Eq. 3})$$

It will be appreciated that Equations 2 and 3 refer to a two-dimensional depth map and a two-dimensional confidence map, respectively. For each pixel (or subset of pixels) of the reference frame, the depth map contains the most likely estimate of the depth value for the pixel (or subset of pixels) in accordance with the measured DPV and the confidence map contains the probability value for that depth candidate sampled from the measured DPV.

In an embodiment, the features extracted by the first neural network and, subsequently, the measured DPV, depth map, and/or confidence map are generated at a lower resolution than the image frames in the sequence of input images. For example, the features can be extracted at ¼ the resolution in both dimensions of the pixel space and, therefore, each sample of the measured DPV represents a 4×4 block of pixels of the reference image.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
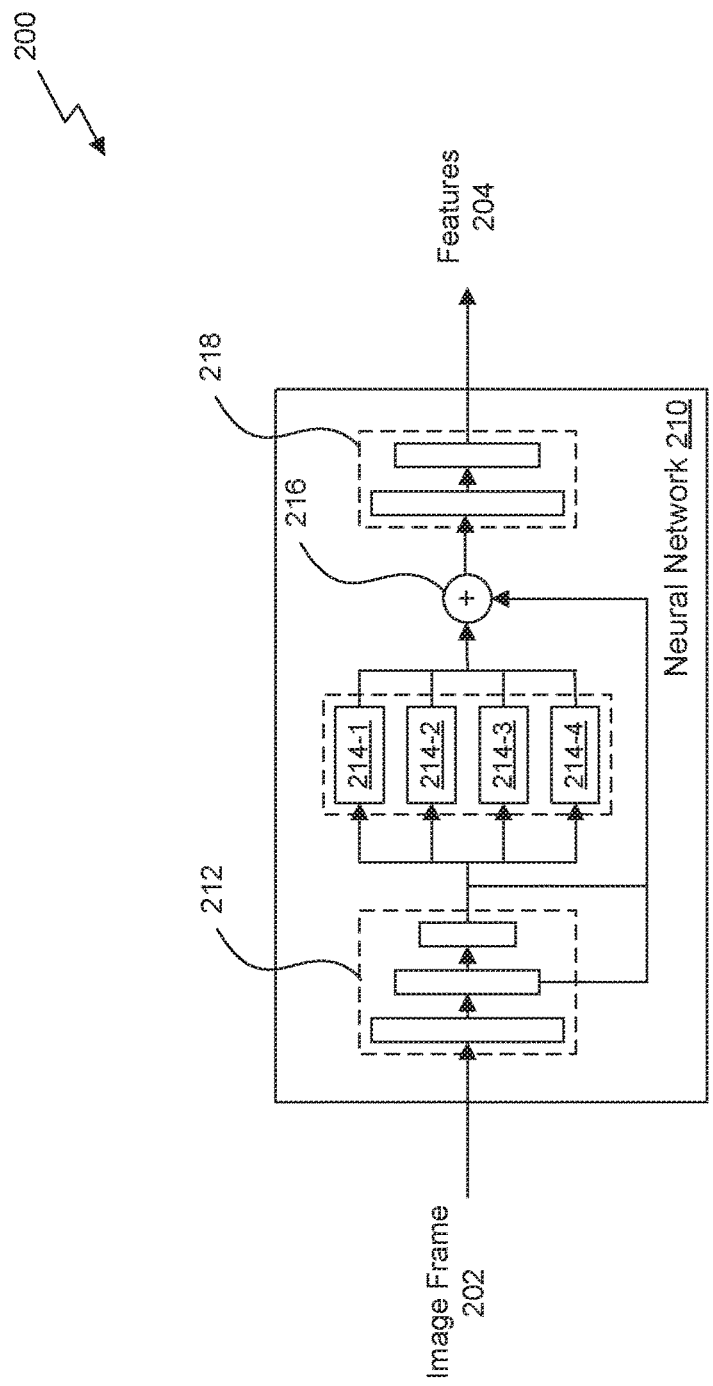
FIG. 2A illustrates a system configured to extract features associated with an image frame, in accordance with an embodiment.

FIG. 2A illustrates a system 200 configured to extract features 204 from an image frame 202, in accordance with an embodiment. As depicted in FIG. 2A, the system 200 includes a first neural network 210. The first neural network 210 includes a number of layers that are configured to process, sequentially, the image frame 202 to extract the features 204.

In one embodiment, the first neural network 210 is a convolutional neural network (CNN) that includes a spatial pyramid module with a number of branches. The input to the first neural network 210 is an image frame 202, which has three channels, each channel having dimensions, in pixel space, of H×W. The resolution of the input can be fixed, such as 512 pixels by 512 pixels. Alternately, the input can be cropped, padded, stretched, or otherwise manipulated to fit a fixed resolution required by first layer of the CNN. It will be appreciated that the CNN can be configured to handle any sized input including, e.g., 1080×1920 resolution image frames.

In one embodiment, the layers of the first neural network 210 include a plurality of convolution layers 212 that are configured to reduce a spatial resolution of the input and extract features of the image frame 202. The features of the image frame 202 are represented by the various channels of the output of each layer.

In one embodiment, the plurality of convolution layers 212 includes a number of stages, each stage including one or more convolution layers. A first stage includes three convolution layers. A first convolution layer applies a convolution operation using a 3×3 convolution kernel to each channel of the image frame 202. The first convolution layer can be configured to generate an output including 32 channels, each channel having dimensions H/2×W/2 due to the convolution operation using a stride of 2 in each dimension of the pixel space. In some embodiments, the first convolution layer is followed by an activation function, such as an activation function implemented by a rectified linear unit (ReLU), a leaky ReLU, or a Sigmoid function.

In one embodiment, the activations output by the activation function are provided as the input to a second convolution layer of the first stage. The second convolution layer applies a convolution operation using a 3×3 convolution kernel to each channel of the input to the second convolution layer. The convolution operation of the second convolution layer uses a stride of 1 in each dimension of the pixel space and, therefore, the dimensions, in pixel space, of each channel of the output of the second convolution layer remains the same as the dimensions, in pixel space, of the input to the second convolution layer. The second convolution layer can be followed by another activation function. In one embodiment, the second convolution layer is followed by a third convolution layer, similar to the second layer, but configured to use different convolution kernels (e.g., kernels having different values for the kernel coefficients).

A second stage follows the first stage and includes a number of additional convolution layers. At least one convolution layer in the second stage implements a convolution operation using a stride of 2 to reduce the spatial resolution, in pixel space, of each channel of the output compared to the input.

A third stage, fourth stage, and fifth stage follow the second stage. In one embodiment, the output of the last convolution layer in the convolution layers 212 is an output including 128 channels, each channel having dimensions H/4×W/4, where H and W are the height and width of the image frame 202, respectively. The convolution operation applied by each of the additional convolution layers, in one embodiment, can utilize a 3×3 convolution kernel. However, in other embodiments, different sized convolution kernels can be used instead of the 3×3 convolution kernel. Furthermore, in various embodiments, each of the convolution layers may use different sized convolution kernels. For example, one convolution layer can use a 5×5 convolution kernel while another convolution layer can use a 3×3 convolution kernel.

In one embodiment, at least one convolution layer implements a dilated convolution operation. As used herein, a dilated convolution operation refers to a convolution operation where the coefficients are applied to a subset of elements within an expanded window of the input. For example, with a dilation factor of 2, a 3×3 convolution kernel is applied to a 5×5 window of elements, where every other element is skipped such that 9 coefficients are applied to a subset of 9 elements within the 5×5 window. Dilated convolution operations increase the receptive field of each pixel without increasing the number of coefficients predicted for the layer that would be required if a convolution operation using a larger convolution kernel were implemented by the layer.

In one embodiment, the output of the last convolution layer is supplied to a spatial pyramid module including a plurality of branches 214. Each branch 214 can include a pooling layer, a convolution layer, an activation function, and a bilinear interpolation layer. In one embodiment, each branch 214 includes a pooling layer having a different pooling window and stride size. For example, in one embodiment, the plurality of branches 214 can include four branches: (1) a first branch 214-1 that implements a pooling layer using a pooling window of size 66×64 and stride of 64; (2) a second branch 214-2 that implements a pooling layer using a pooling window of size 32'32 and stride of 32; (3) a third branch 214-3 that implements a pooling layer using a pooling window of size 16×16 and stride of 16; and (4) a fourth branch 214-4 that implements a pooling layer using a pooling window of size 8×8 and stride of 8. The convolution layer of each branch 214 applies a convolution operation to the output of the pooling layer using a 1×1 convolution kernel. The convolution layer also reduces the number of channels of the input from 128 channels to 32 channels. The activation function can be implemented by, e.g., a ReLU.

The bilinear interpolation layer then takes the down-sampled activations from the ReLU and up-samples the activations back to the original resolution of the input to the branch 214. For example, the pooling layer of the first branch 214-1 calculates an average value of the activations within each 64×64 window and sets a corresponding value in the output of the pooling layer. The output of the pooling layer is reduced in resolution by a factor of 64 in each dimension in the pixel space. The average values in this down-sampled output of the pooling layer, after subsequent modification by the convolution layer and activation function, are then up-sampled back to the original resolution of the input, which, in the case of the first branch 214-1, generates 64×64 interpolated values for each value of the down-sampled input to the bilinear interpolation layer.

It will be appreciated that each branch 214 essentially filters the input at a different spatial resolution and then up-samples the result to a common resolution shared at the input to all of the branches 214. The output of each of the plurality of branches 214 is then concatenated, via a concatenation layer 216, with the outputs of one or more layers of the convolution layers 212. In one embodiment, the output of each of the plurality of branches 214 is concatenated with the output of the last convolution layer in the convolution layers 212 (e.g., the input to the branches 214) as well as one additional intermediate convolution layer 212, such as the output of the third stage of the convolution layers 212. In one embodiment, the output of the concatenation layer 216 is an output including 320 channels, each channel having dimensions H/4×W/4. The 320 channels include 32 channels from the output of each of the branches 214, 128 channels from the last convolution layer and 64 channels from the intermediate convolution layer of the convolution layers 212.

In one embodiment, the output of the concatenation layer 216 is provided to one or more fusion layers 218. The fusion layers 218 can include a first convolution layer that applies a convolution operation using a 3×3 convolution kernel. The number of channels of the input can be reduced from, for example, 320 channels to 128 channels. The fusion layers 218 can also include a second convolution layer that applies a convolution operation using a 1×1 convolution kernel. The number of channels of the input can be reduced from, for example, 128 channels to, e.g., 64 channels.

In one embodiment, the output of the fusion layers 218 are the features 204 extracted from the image frame 202. The features 204 can be used directly to generate a DPV for the image frame 202. For example, each channel of the output represents a discrete candidate depth value. In other words, each channel of the features 204 is a feature map that comprises an image (e.g., a 2D array of values) that, at a reduced resolution of H/4×W/4, includes values in the range of [0,1] that represent a probability that a particular pixel or group of pixels of the image frame 202 is associated with a particular candidate depth value corresponding to that channel. It will be appreciated that, in one embodiment, the channels of the features 204 have a resolution that is less than the resolution of the original image frame 202. Consequently, each probability value in the probability map for a particular depth candidate can correspond with a subset of pixels in the image frame 202. In other embodiments, the first neural network 210 is configured to extract the features 204 at the same resolution of the image frame 202. In yet other embodiments, each channel of the features 204 can be up-sampled in a post-processing step using, e.g., bilinear interpolation to match the resolution of the image frame 202.

Figure 2B:
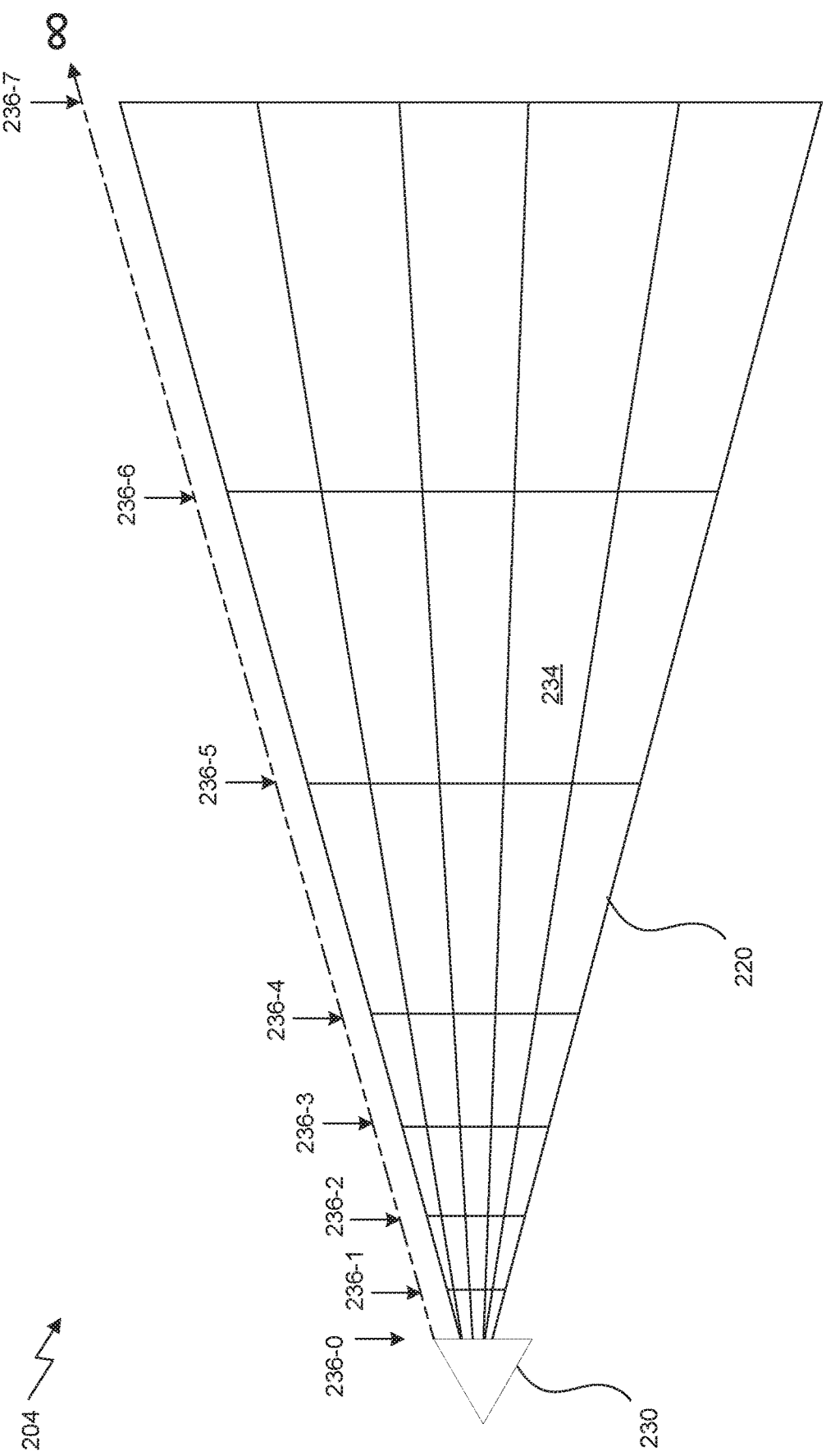
FIG. 2B is a conceptual illustration of a depth probability volume as defined in accordance with a view frustum associated with a monocular image sensor, in accordance with an embodiment.

FIG. 2B is a conceptual illustration of a DPV as defined in accordance with a view frustum 220 associated with a monocular image sensor 230, in accordance with an embodiment. The frustum 220 can be divided into a number of voxels (volumetric element) 234. Each voxel 234 is associated with a pixel or subset of pixels of an image captured by the monocular image sensor 230. The voxels 234 are defined by cutting planes 236 located at the different depth locations (e.g., 236-0, 236-1, 236-2, 236-3, 236-4, 236-5, 236-6, and 236-7) within the scene captured by the monocular image sensor 230. A set of voxels 234 between any two cutting planes 236 (e.g., between cutting planes 236-5 and 236-6) correspond with a channel of the features 204, where the probability values for that channel in the features 204 are predicted probabilities that an object in the scene captured by the monocular image sensor 230 intersects a voxel 234 in the set of voxels between the two corresponding cutting planes 236. The frustum 220 thereby defines a non-parametric volume associated with the DPV, with the depths of respective cutting planes 236 increasing proportionally with distance from the image sensor 230.

As depicted in FIG. 2B, the depth is zero at the image sensor 230 itself, and increases with increasing distance from image sensor 230 (e.g., from 236-1 to 236-7). Fewer or more cutting planes 236 may be assigned when defining the frustum, but it will be appreciated that a practical limit may be imposed on the number of, and maximum value used for, candidate depth values for the cutting planes 236 despite an image frame potentially representing an infinite depth. In addition, the distance between cutting planes is not required to be uniform. For example, the distance between any two cutting planes 236 can increase (e.g., linearly or exponentially) with the distance from the image sensor 230.

The features 204 can be denoted as p(d; u, v), which represents the probability of pixel (u, v) having a depth value d, where d∈[$d_{min}$, $d_{max}$]. Due to perspective projection, the features 204 is defined relative to the frustum 220 attached to the image sensor 230. The parameters $d_{min}$ and $d_{max}$ are the near and far clipping planes 236 of the frustum 220, which is sub-divided into, e.g., N=65 planes over the range of depth candidates forming 64 sets of voxels corresponding to 64 channels of the features 204. The features 204 contain the complete statistical distribution of probabilities of objects represented by a pixel or block of pixels located at particular depths for a given scene captured by the image frame 202.

Again, the components of the system 200 can be implemented, at least in part, on a processor, such as a CPU, GPU, or any other processor capable of implementing, in hardware, software, or a combination of hardware or software, the functions described herein. One such example of a parallel processing unit capable of implementing the layers of the neural network modules is described in more detail below.

Parallel Processing Architecture

Figure 3:
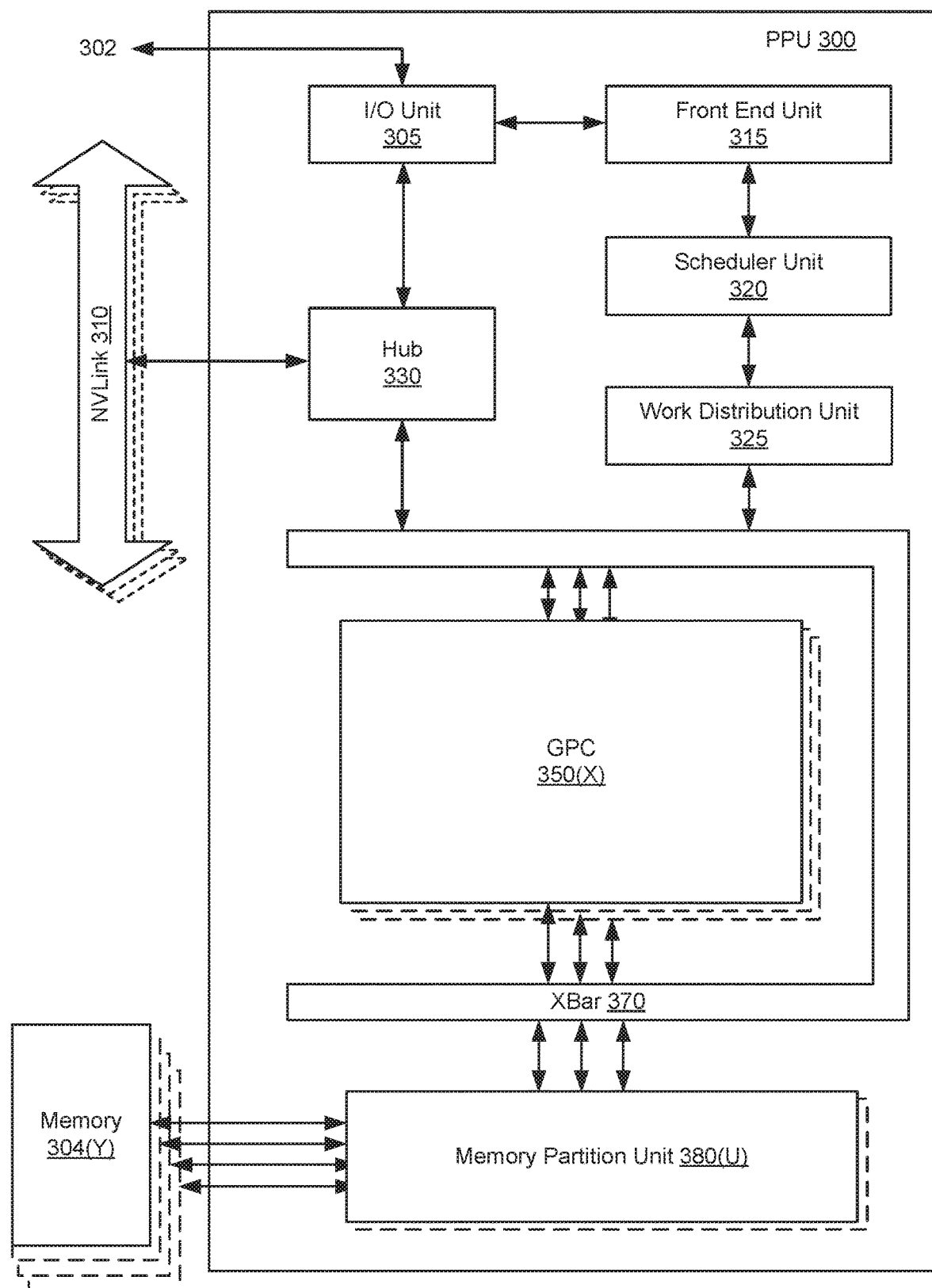
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
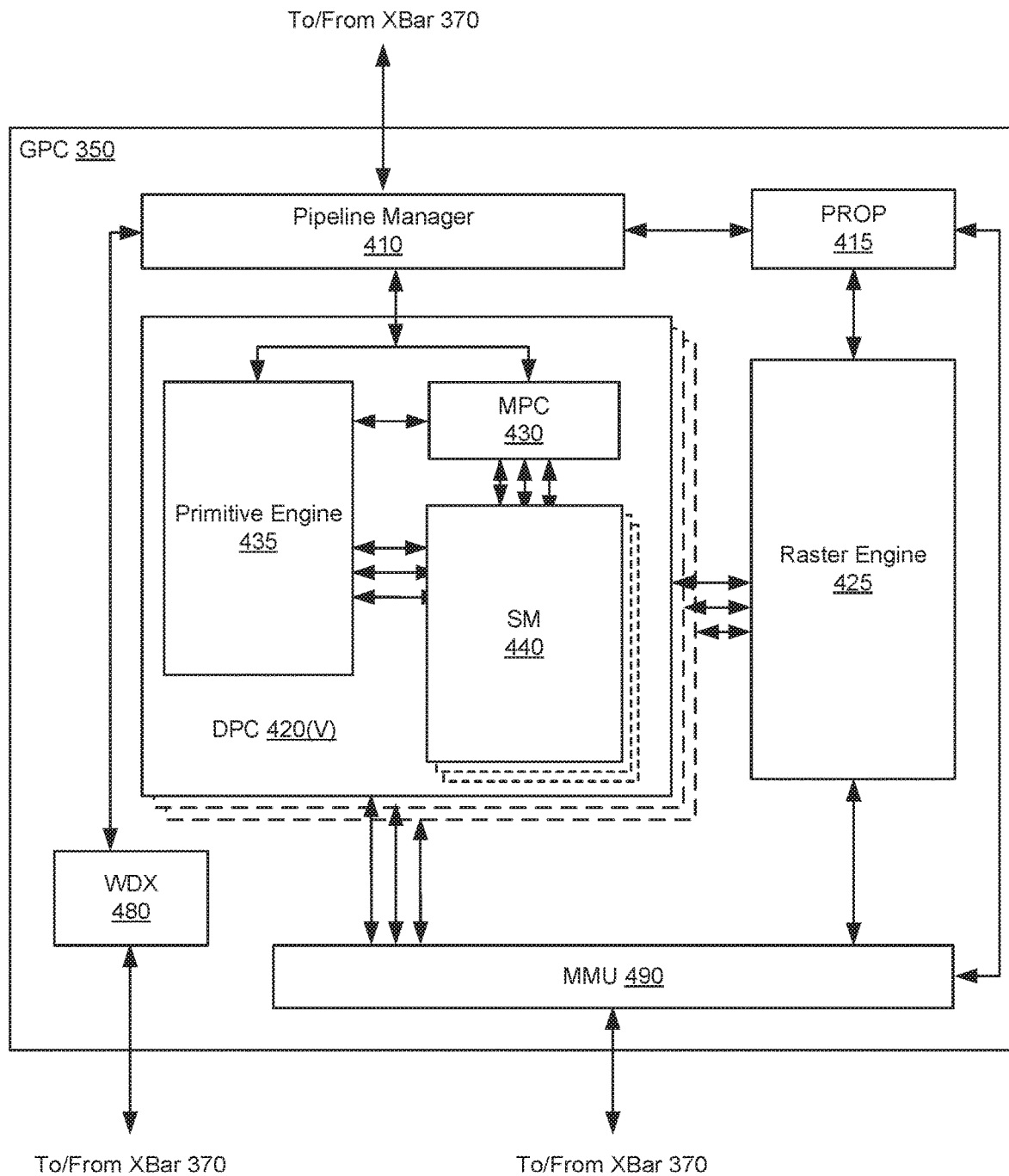
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
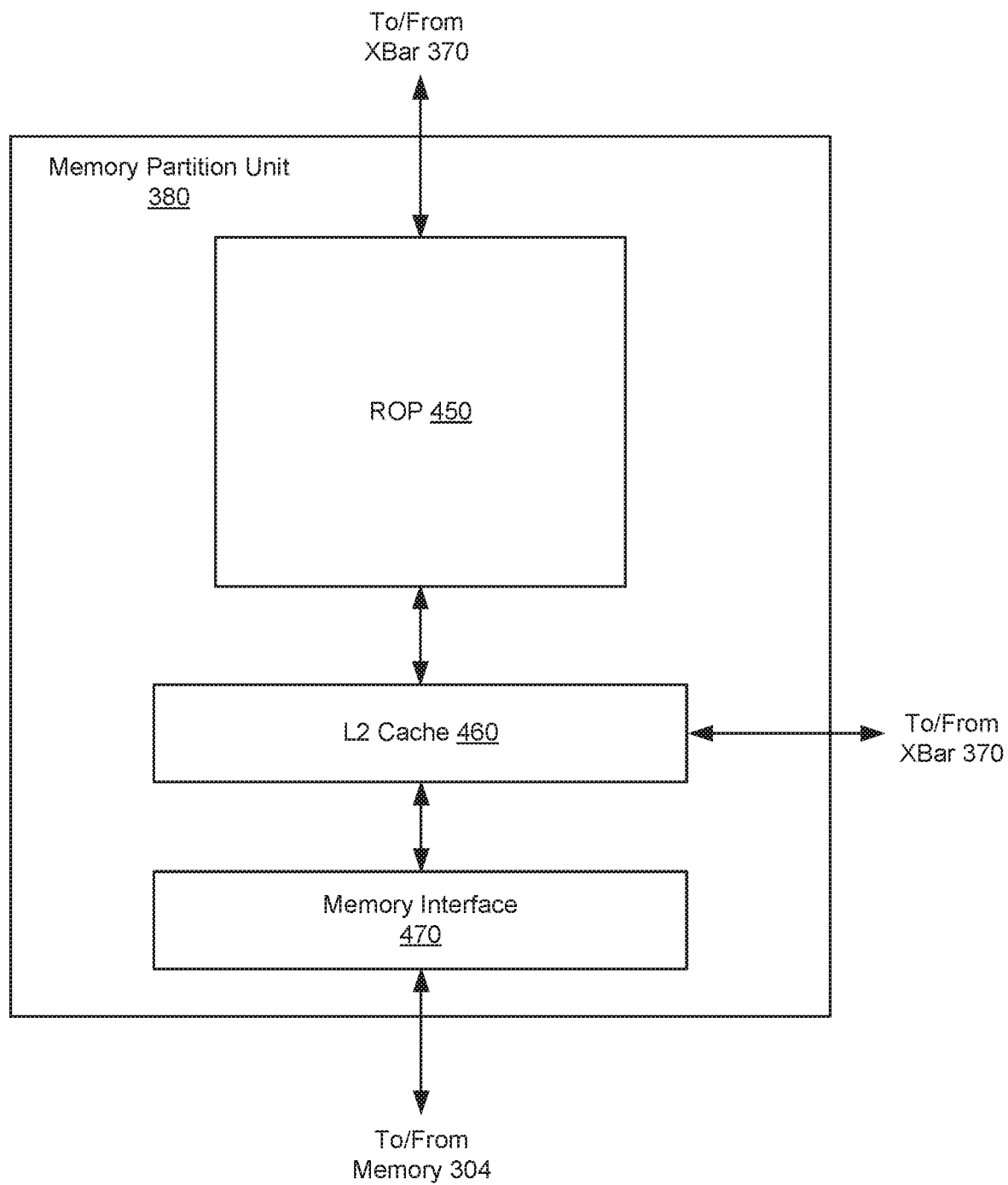
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
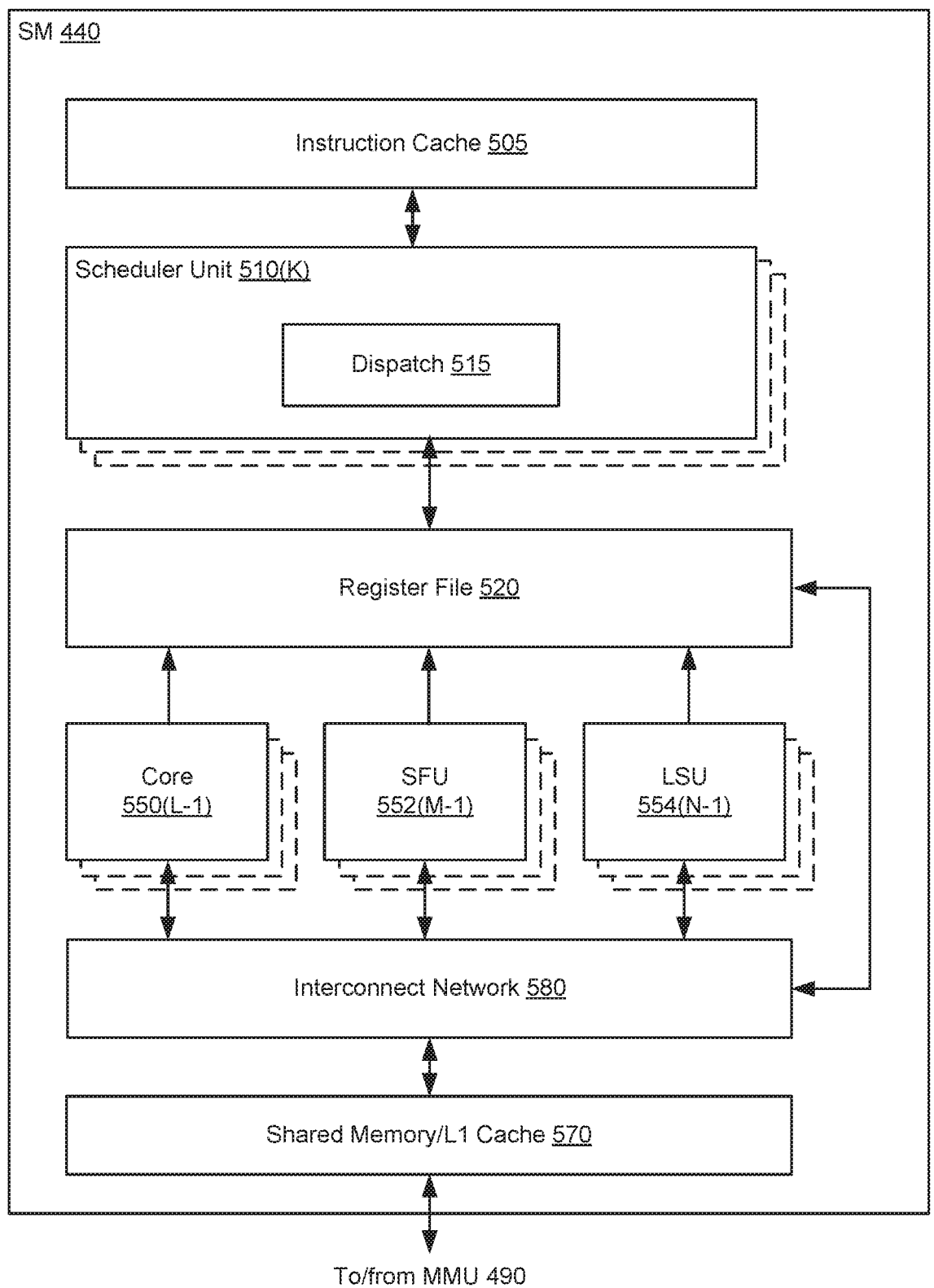
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/ L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
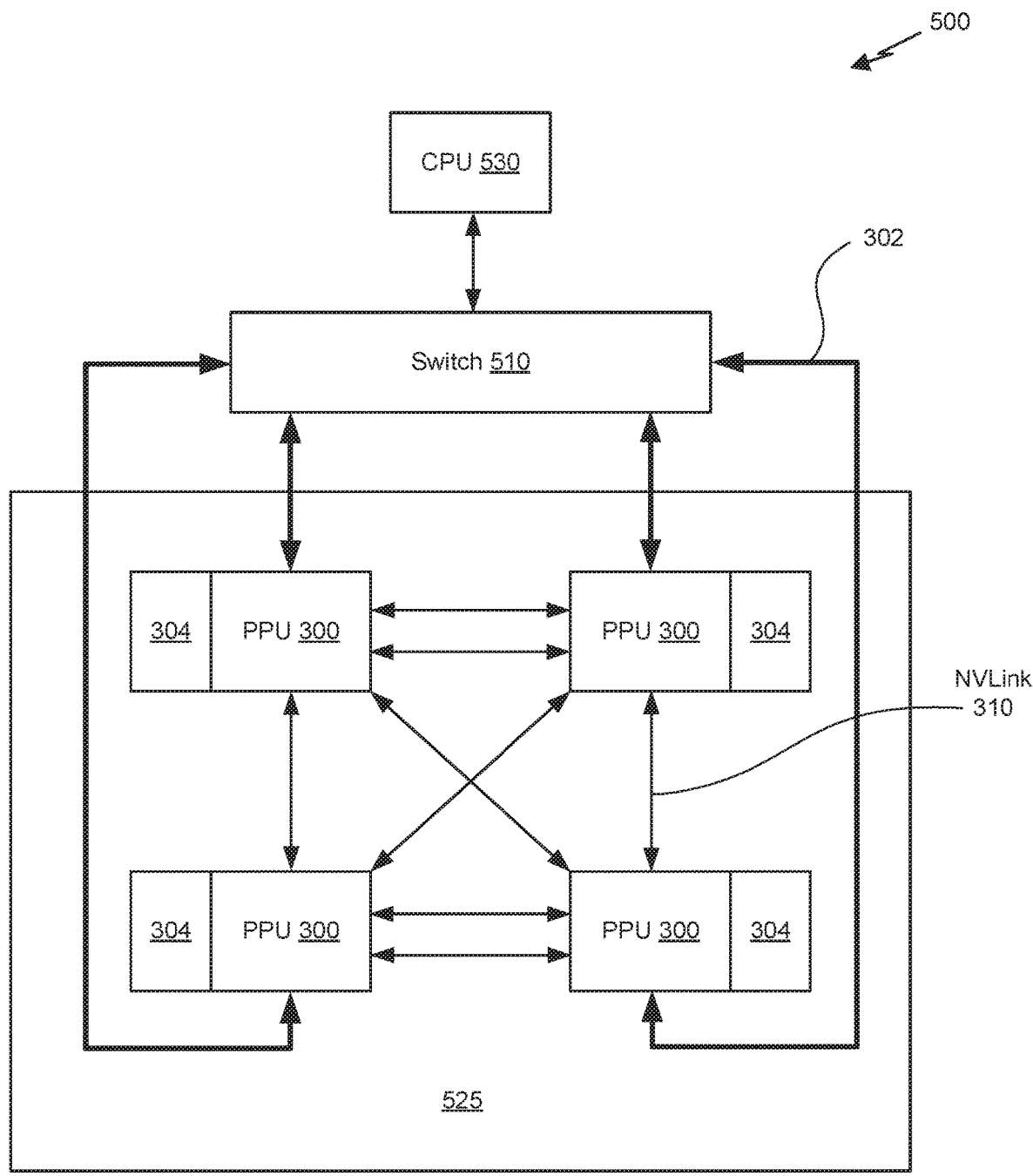
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
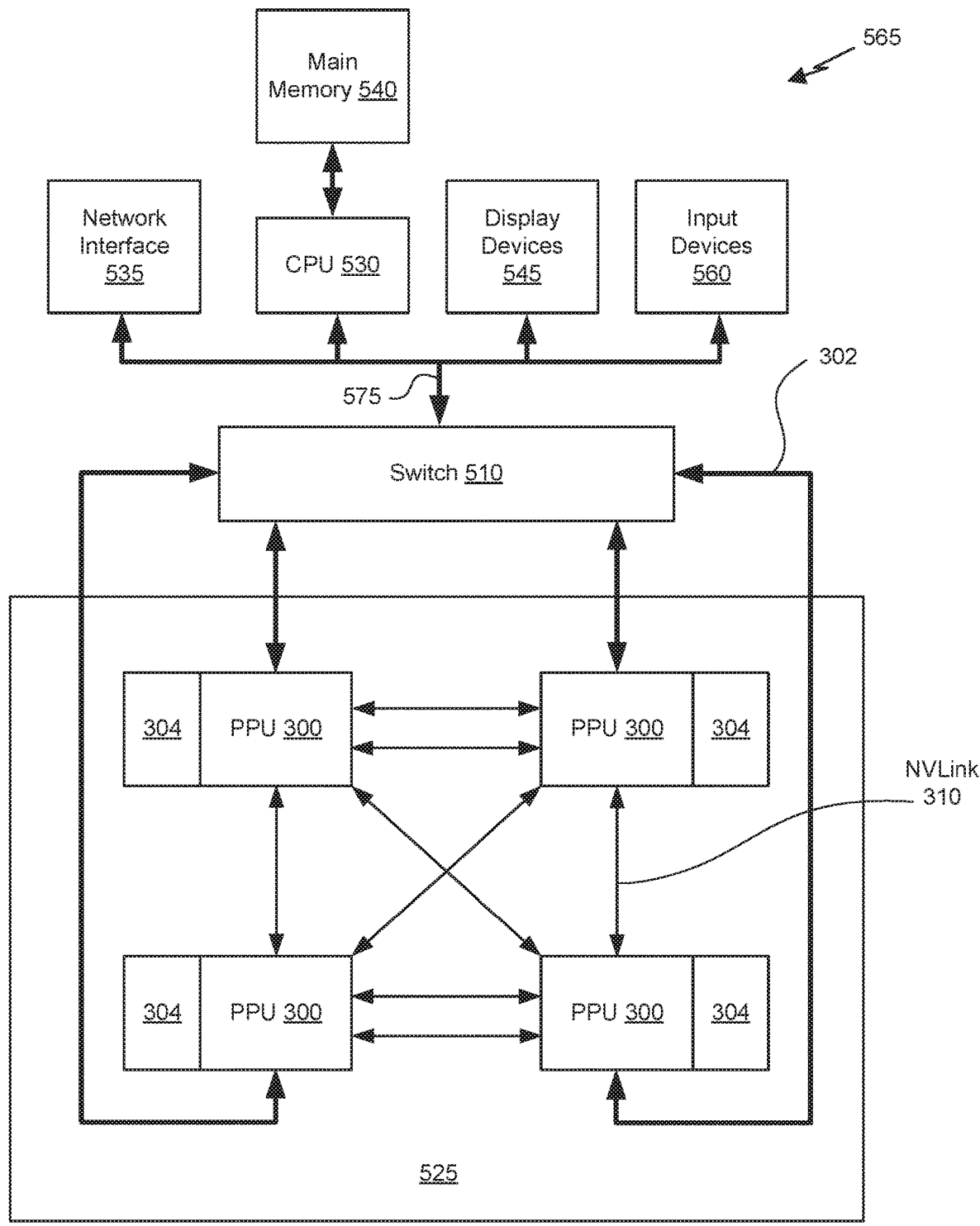
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
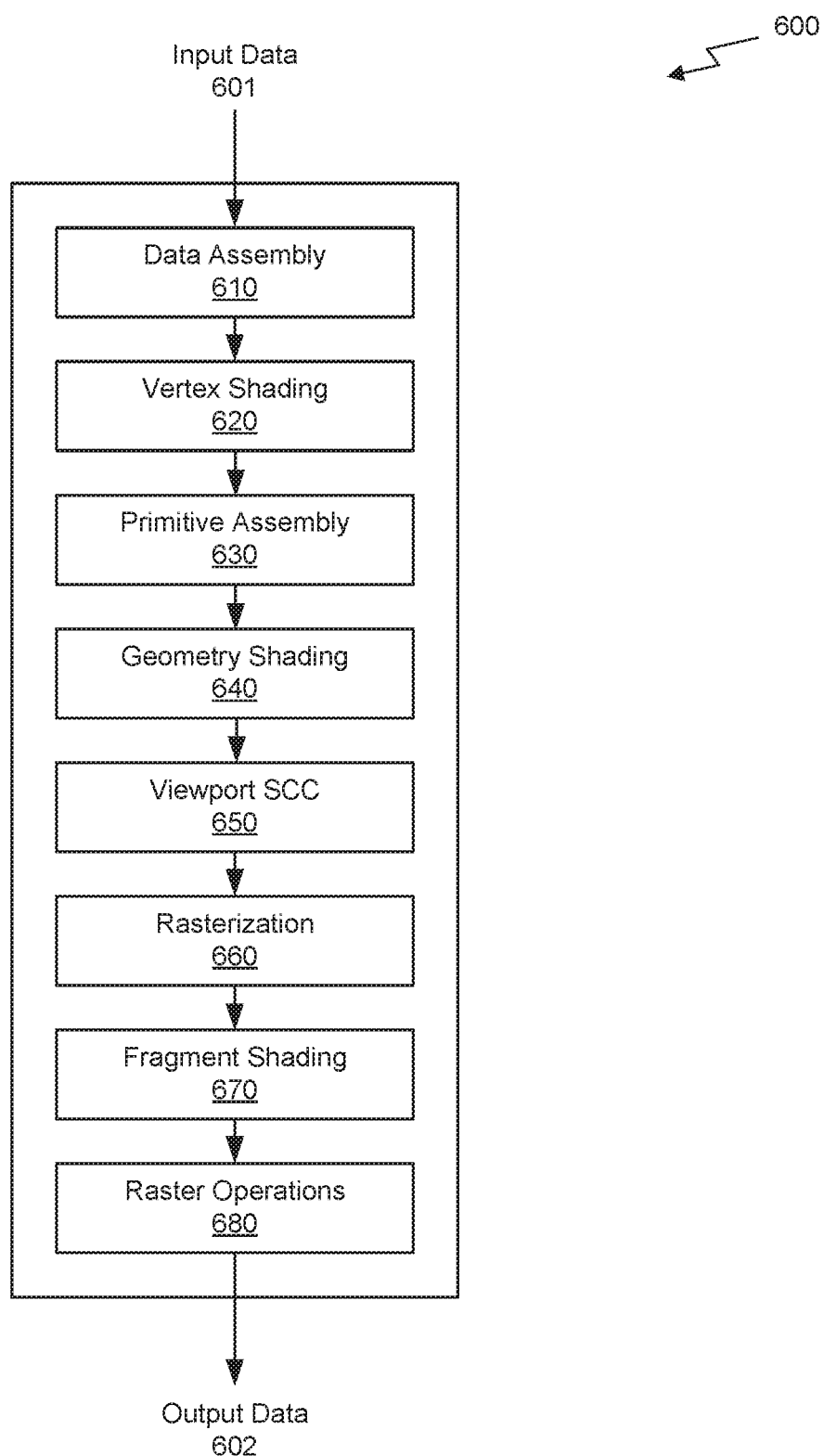
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Estimating Depth from Monocular Image Sensor Data

It will be appreciated that the system 200 receives an image frame 202 and extracts features 204 for the image frame 202 using the layers of the first neural network 210. The system 200 could be utilized to generate a DPV for a sequence of image frames (e.g., a video stream) captured by a monocular image sensor 230, but the system 200 is not designed such that the DPV for a reference frame is based on, at least in part, the features 204 extracted by the first neural network 210 for neighboring frames in the sequence of image frames. Consequently, as the image frame 202 changes from frame to frame, there is nothing in the design of the system 200 that guides the output of features 204 in a sequence of image frames to be consistent from frame to frame.

However, the system 200 can be adapted, when processing a video stream, to treat the features extracted at time t as hidden state that can be updated as subsequent image frames are captured in the sequence of image frames. More specifically, a measured DPV associated with a sliding window can be updated as new observations of the scene are captured by the image sensor 230, especially when the frustum 220 defined for one image frame overlaps, at least partially, with a frustum 220 defined for one or more adjacent image frames within the sliding window. In addition, if the camera motion can be tracked, a measured DPV for a next frame can be predicted based on the current state of the measured DPV. Consequently, a Bayesian filtering scheme can be implemented to update the measured DPV over time to increase the accuracy of the measured DPV.

Figure 7:
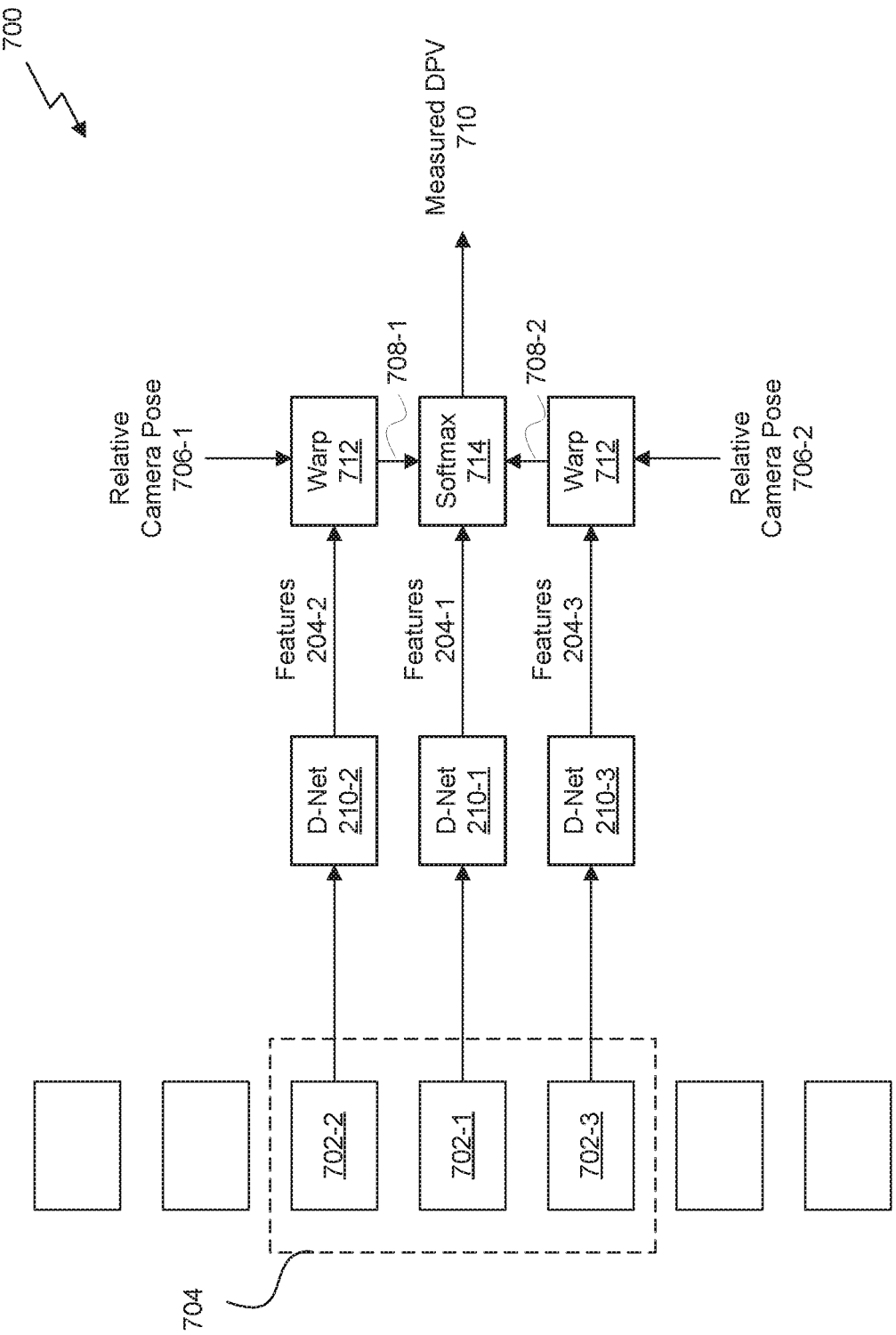
FIG. 7 is a conceptual diagram illustrating a system that utilizes instances of the neural network model to generate a measured DPV for a reference frame associated with a sliding window, in accordance with some embodiments.

FIG. 7 is a conceptual diagram illustrating a system 700 that utilizes instances of the neural network model 210 to generate a measured DPV 710 for a reference frame 702-1 associated with a sliding window 704, in accordance with some embodiments. A video stream is received by the system 700 as input, where the video stream includes one or more image frames in a sequence of image frames. Each image frame can be captured by the monocular image sensor 230 and stored in a memory, such as memory 304.

A sliding window 704 is defined that includes a reference frame 702-1 and a number of source frames (e.g., 702-2, 702-3, etc.) immediately adjacent to the reference frame 702-1. In an embodiment, the reference frame 702-1 is centered in the sliding window 704. In other embodiments, the reference frame 702-1 can be the newest image frame entering the sliding window 704. In an embodiment, the sliding window 704 includes the reference frame 702-1, a first source frame 702-2 immediately preceding the reference frame 702-1, and a second source frame 702-3 immediately following the reference frame 702-1. In other embodiments, the sliding window 704 may be expanded to include additional source frames in the sequence of image frames, such as two source frames immediately preceding the reference frame 702-1 and two source frames immediately following the reference frame 702-1.

In some embodiments, the sequence of image frames can be captured at, e.g., 30 frames per second. The size of the sliding window 704 can include, e.g., 21 frames. However, a number of frames in the sliding window 704 can be ignored. For example, the reference frame 702-1 can be centered in the sliding window and denoted as frame N, and the source frames can be defined as frame N−2Δt, frame N−Δt, frame N+Δt, and frame N+2Δt where Δt=5. Consequently, the source frames may not be immediately adjacent to the reference frame 702-1 in the video stream captured at 30 fps; however, all image frames in the sliding window 704 other than the reference frame 702-1 and the four source frames are ignored. The effect of such embodiments is that the sliding window 704 reduces the effective frame rate of the video stream utilized to update the measured DPV 710 for a particular reference frame.

For a given sliding window 704 associated with time t, the reference frame 702-1 and at least one source frame within the sliding window 704 are processed by instances of the first neural network 210, D-Net, to extract corresponding features 204 for each image frame. Each instance of the first neural network 210 can share the attributes (e.g., have the same weights/bias values) of the other instances of the first neural network 210. In other words, the attributes of each instance of the first neural network 210 can be stored in a shared memory accessible by all instances of the first neural network 210.

For example, as depicted in FIG. 7, a reference frame 702-1, centered in the sliding window 704, can be processed by a first instance of the first neural network 210-1 to extract features 204-1 from the reference frame 702-1, and each of the source frames in the sliding window 704 is processed by another instance of the first neural network 210 to extract corresponding features 204 for the source frame. More specifically, a first source frame 702-2 is processed by a second instance of the first neural network 210-2 to extract features 204-2 for the first source frame 702-2, and a second source frame 702-3 is processed by a third instance of the first neural network 210-3 to extract features 204-3 for the second source frame 702-3.

In some embodiments, at each discrete time, the sliding window 704 is advanced by one image frame in the sequence of image frames. In such embodiments, the features 204 for many of the image frames in the sliding window 704 have been extracted during previous time periods, being stored temporarily in a memory (e.g., memory 304), and only a single instance of the first neural network 210 is required to extract features 204 for the new image frame introduced to the sliding window 704.

Because the source frames are captured by the image sensor 230 close in time with capturing the reference frame 702-1, each of the source frames is likely to capture at least a portion of the same scene as the reference frame 702-1. In other words, at least some of the voxels 234 included in a frustum 220 for a source frame are likely to overlap voxels 234 in a frustum 220 for the reference frame 702-1. Therefore, there should be some consistency between the probability values of certain voxels predicted for the source frames with probability values of overlapping voxels predicted for the reference frame 702-1.

Figure 8:
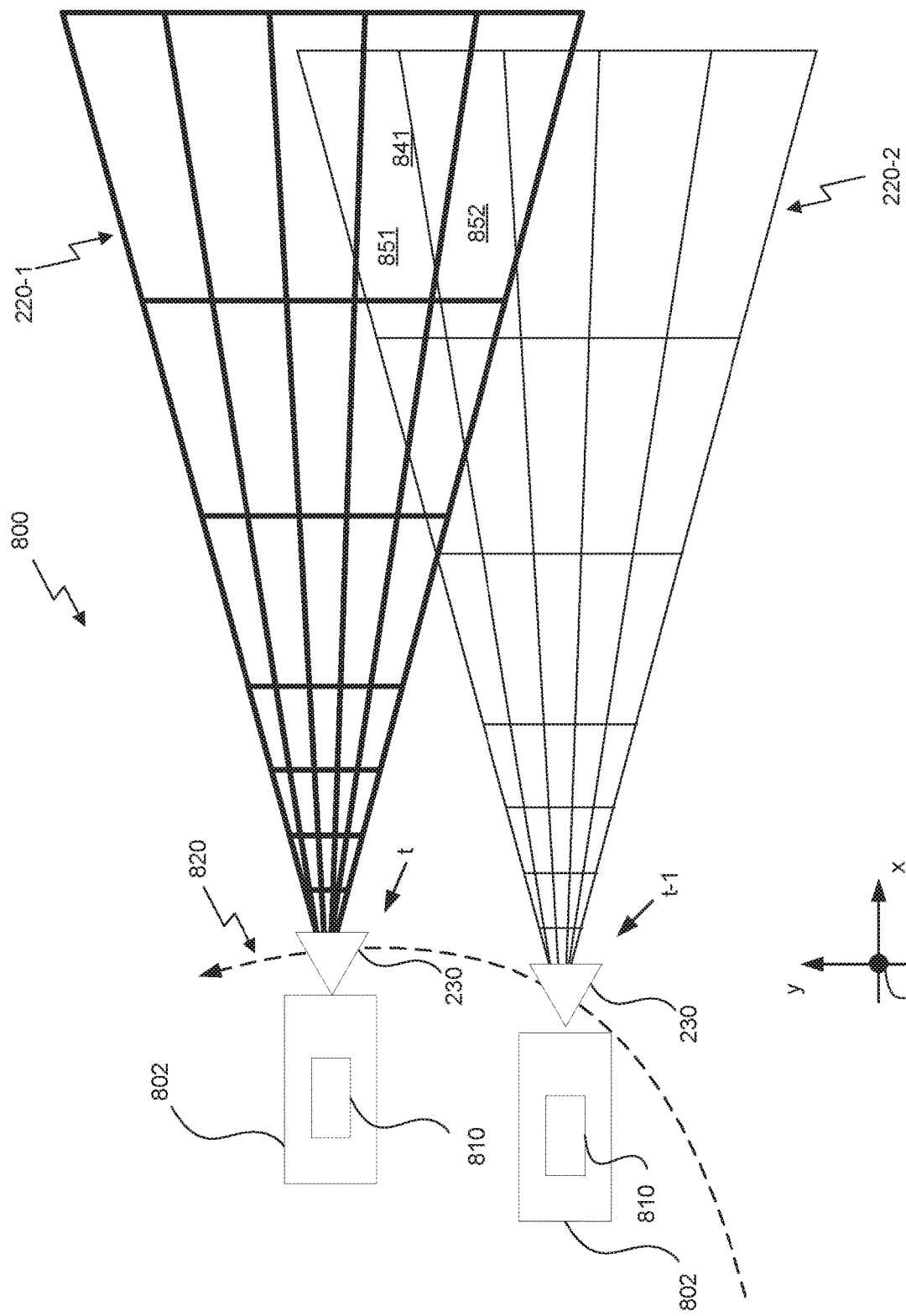
FIG. 8 is a conceptual diagram of an operating environment of a system configured to capture a sequence of image frames utilizing a monocular image sensor, in accordance with some embodiments.

FIG. 8 is a conceptual diagram of an operating environment 800 of the system 700 configured to capture a sequence of image frames 702 utilizing a monocular image sensor 230, in accordance with some embodiments. As depicted in FIG. 8, the image sensor 230 can be included in an apparatus 802, such as a digital camera, mobile phone, multi-axis robot, autonomous vehicle, wearable device (e.g., watch, VR display, etc.), or the like. In some embodiments, the image sensor 230 is included in a sensor package that includes a substrate such as a printed circuit board, a means for communication with a memory or host processor (e.g., a wireless transceiver or a wired communication controller such as a serial port controller or USB controller), and optical components such as a lens, mirrors, or shutter device.

In an embodiment, the apparatus 802 includes a positional sensing subsystem 810 that is used to detect the position and/or orientation of the apparatus 802 relative to a coordinate system 830. The positional sensing subsystem 810 can include an inertial measurement unit (IMU) including single-axis or multi-axis gyroscopes, accelerometers, magnetometers, or any other type of sensor that is able to track a position and/or orientation of an object. It will be appreciated that the apparatus 802 is not static and can move relative to the coordinate system 830 along a trajectory 820. The image sensor 230 captures an image frame at time t at a first position along the trajectory 820. The image frame can be processed by the first neural network model 210 to extract features 204 associated with a view frustum 220-1 defined within the three-dimensional space.

At time t−1 prior to time t, the image sensor 230 captures an image frame at a second position along the trajectory 820. The image fame can be processed by an instance of the first neural network 210 to extract features 204 associated with a second view frustum 220-2. It will be appreciated that at least some of the voxels in the two corresponding frustums 220 do not overlap in the space defined by the coordinate system 830. However, given the proximity of the position and the similarity of the orientation of the image sensor 230 between the first position and the second position along the trajectory 820, it is highly likely that at least a portion of the frustum 220-1 overlaps with a portion of the frustum 220-2.

For example, a voxel 841 of the frustum 220-1 associated with the image frame captured at time t overlaps with a voxel 851 and a voxel 852 of the frustum 220-2 associated with the image frame captured at time t−1. Consequently, an object at a position in space relative to the coordinate system 830 in the image frame captured at time t and overlapping the voxel 841, where the object is stationary between time t−1 and time t, is likely to overlap at least one of voxel 851 or voxel 852 in the image frame captured at time t−1.

It will be appreciated that the operating environment 800 is shown and described relative to a two-dimensional depiction of the operating environment 800 for ease of illustration. However, the operating environment 800 exists in a three-dimensional space and, therefore, the concept of the frustums 220, the trajectory 820, and the coordinate system 830 as depicted in FIG. 8 can be extended to the three-dimensional space. In other words, the position of the image sensor 230 can be defined using, e.g., a three-coordinate vector such as an x-coordinate, a y-coordinate, and a z-coordinate relative to the origin of the coordinate system 830. Similarly, the orientation of the image sensor 230 can be defined using, e.g., a three-coordinate vector such as an x-axis rotation, a y-axis rotation, and a z-axis rotation. The extents of the voxels 234 of the frustums 220 can then be determined by projecting rays associated with pixels or subsets of pixels into the three-dimensional space and determining the position of vertices for each voxel 234 by determining the intersection of cutting planes 236 with the rays.

Referring back to FIG. 7, rather than relying on the features 204-1 extracted by the neural network 210 for the reference frame 702-1 alone, the system 700 combines multiple sets of features 204 extracted by the first neural network 210 for multiple image frames within the sliding window 704 to generate a measured DPV 710 for the reference frame 702-1. The measured DPV 710 associated with a multi-frame sliding window 704 is more temporally stable than a DPV based on the features 204-1 of the reference frame 702-1 alone.

In an embodiment, each set of features 204 extracted by an instance of the neural network 210 from a source frame is modified by a warp function 712 based on relative camera pose information 706 received for the source frame. As used herein, relative camera pose information 706 refers to a difference between camera parameters for the source frame and camera parameters for the reference frame 702-1. The camera parameters can include a position and/or orientation of the image sensor as measured by the positional sensing subsystem 810. In some embodiments, the camera parameters can also include configuration information, such as a lens focal length, zoom parameters, and the like that can be used to calculate a difference between the corresponding frustum 220 defined for each of the source frames and the reference frame 702-1.

The disclosed techniques require determination of relative camera pose information 706 (e.g., relative camera poses δT) between two frames—between a reference frame 702-1 and a source frame—to bootstrap the computation of the measured DPV 710 via the warp function 712. Several plausible options exist and have been evaluated for purposes of this disclosure. In many applications, such as autonomous driving and AR, initial camera poses for image sensor 230 may be provided by additional sensors such as a global positioning sensor (GPS), an odometer, or the IMU of the positional sensing subsystem 810, for example. Alternatively, monocular visual odometry techniques, such as direct sparse odometry (DSO), can be implemented to obtain the initial camera poses for image sensor 230, either instead of or in addition to the above described IMU, GPS and/or odometer-based position sensing modalities. An exemplary DSO technique is described in J. Engel, et al., "Direct Sparse Odometry," in *IEEE Transactions on Pattern Analysis and Machine Intelligence (TPAMI)*, volume 40, pages 611-625 (2018), which is incorporated by reference herein in its entirety.

The warp function 712 generates a warped version of the features 708 for a corresponding source frame by sampling the features 204 for the source frame based on the relative camera pose information 706. This technique can be referred to as grid sampling. In an embodiment, the warp function 712 samples the values in the feature maps 204 for a source frame to predict probability values associated with a frustum 220-2 that matches the frustum 220-1 for the features 204-1 of the reference frame 702-1. For example, for each voxel of the frustum 220-1 associated with the features 204-1 for the reference frame 702-1, the warp function 712 can determine whether that voxel overlaps one or more voxels of the frustum 220-2 associated with the features 204-2 for the source frame 702-2.

In an embodiment, the warp function 712 can sample the probability value for a particular voxel of the frustum 220-2 for the source frame that is associated with the largest overlapping volume with a corresponding voxel for the frustum 220-1 for the reference frame 702-1. Alternatively, the warp function 712 can sample the probability value for a particular voxel of the frustum 220-2 for the source frame that is associated with the closest overlapping voxel for the frustum 220-1 for the source frame 702-1. In another embodiment, the warp function 712 can sample multiple probability values for two or more voxels for the frustum 220-2 for the source frame that overlap with the corresponding voxel for the frustum 220-1 for the reference frame 702-1.

In an embodiment, the features 204-1 for the reference frame 702-1 and the warped versions of the features 708-1 for each of the source frames in the sliding window 704 are processed by a softmax function 714, which outputs the measured DPV 710. More specifically, a cost volume is calculated by summing a difference between the features 204-1 for the reference frame 702-1 and the warped version of the features 708 for each of the source frames, as follows:

$$L(d_t|I_t) = \Sigma_{k \in N, k \neq t} \|f(I_t) - \text{warp}(f(I_k); d_t, \delta T_{kt})\|, \quad \text{(Eq. 4)}$$

where f(•) is a feature extractor defined by the first neural network 210 (e.g., the function that extracts the features 204 from an image frame 202), $\delta T_{kt}$ is the relative camera pose information 706 from source frame $I_k$ to reference frame $I_t$, and warp(•) is the warp function 712 that operates to warp the image features from source frame $I_k$ to reference frame $I_t$. The measured DPV 710 can then be represented as:

$$p(d_t|I_t) = \text{softmax}(L(d_t|I_t)), \quad (\text{Eq. 5})$$

Examination of Equation 5 reveals that the softmax function 714 operates along the depth dimension of the cost volume $L(d_t|I_t)$ to normalize the probability values of the cost volume such that the sum of the elements (e.g., probability values) associated with a particular pixel or subset of pixels sum to one and exist within the range of [0,1]. The distribution function utilized by the softmax function 714 is typically an exponential function, such as Equation 6, but can be other types of distribution functions that map a range of inputs to the range of values between [0,1].

$$\sigma(z) = \frac{e^{\beta z_i}}{\sum_j e^{\beta z_j}} \quad (\text{Eq. 6})$$

Figure 9:
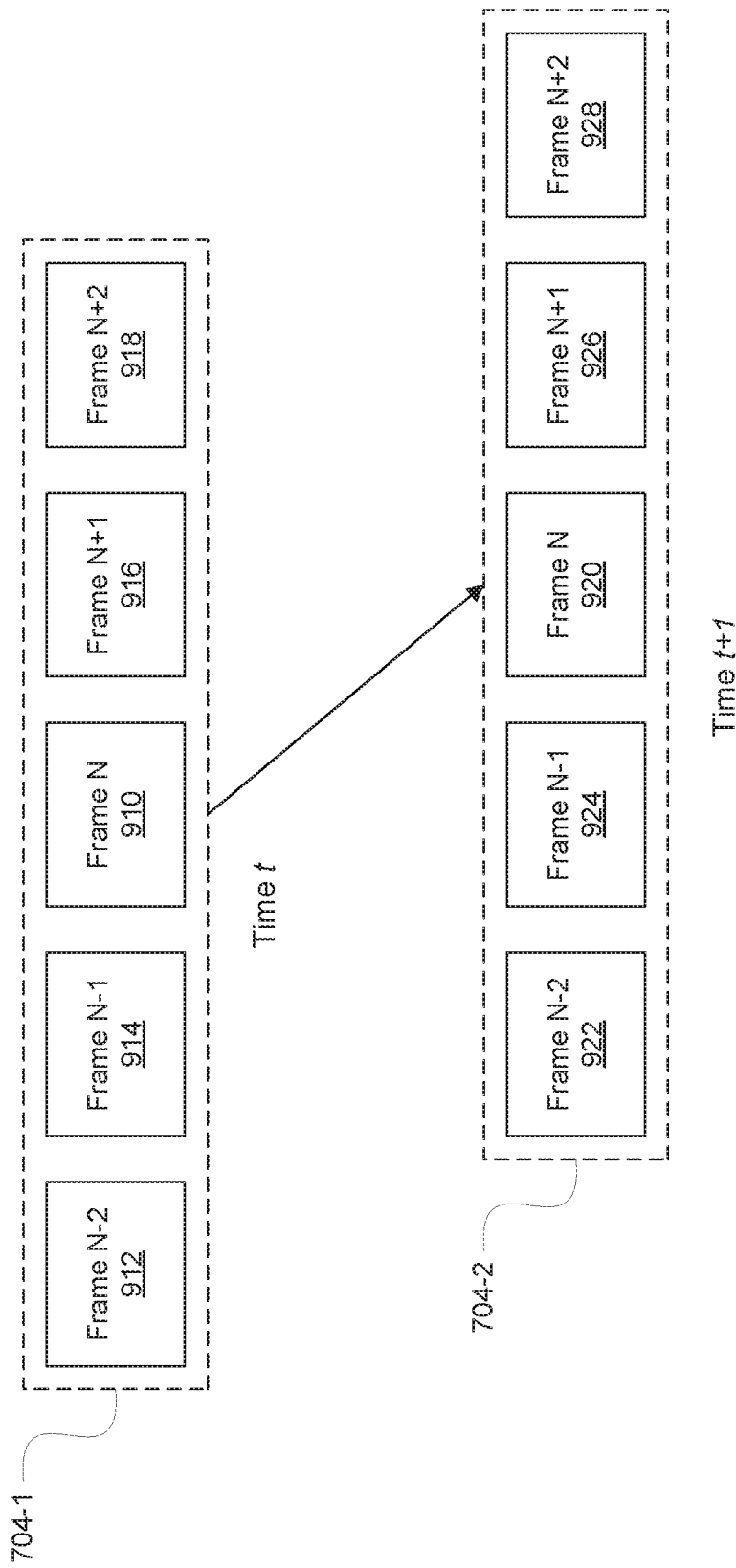
FIG. 9 illustrates a sliding window advancing over a time period from time t to time t+1, in accordance with some embodiments.

FIG. 9 illustrates a sliding window 704 advancing over a time period from time t to time t+1, in accordance with some embodiments. The sliding window 704-1 covers five frames in the sequence of image frames at time t. The frame at the center of the sliding window 704-1, Frame N 910, is the reference frame 702-1. In addition, Frame N−2 912, Frame N−1 914, Frame N+1 916, and Frame N+2 918 are source frames. A measured DPV 710 can be computed for a reference frame 702-1 (e.g., Frame N 910) based on the features 204 extracted by the first neural network 210 for each of the image frames in the sliding window 704-1.

The sliding window 704-1 advances one frame between time t and time t+1 to include five frames in the sequence of image frames within the sliding window 704-2 at time t+1. The image frame at the center of the sliding window 704-2 (e.g., Frame N 920) is the reference frame 702-1 at time t+1 and corresponds to Frame N+1 916 in sliding window 704-1. In addition, Frame N−2 922, Frame N−1 924, and Frame N+1 926 in sliding window 704-2 are source frames and correspond to Frame N−1 914, Frame N 910, and Frame N+2 918 in sliding window 704-1, respectively. A new frame, Frame N+2 928, in the sequence of image frames 702 enters the sliding window 704-2 at time t+1. A measured DPV 710 can be computed for a reference frame 702-1 (e.g., Frame N 920) based on the features 204 extracted by the first neural network 210 for each of the frames in the sliding window 704-2.

It will be appreciated that the features 204 for frames 922, 924, 920, and 926 were extracted, or had already been extracted at times prior to time t, when the measured DPV 710 for Frame N 910 was generated at time t. These features 204 can be stored in a memory and reused at time t+1 when a measured DPV 710 for frame N 920 is generated by the system 700 at time t+1. Consequently, at time t+1, only the Frame N+2 928 is processed by an instance of the neural network 210 to generate corresponding features 204 for Frame N+2 928.

Bayesian Filtering Implementations

In general, one goal when processing a video stream is to integrate the local estimation of a depth probability volume over time to reduce uncertainty (e.g., increase the confidence level associated with each depth estimate). This integration can be naturally implemented as Bayesian filtering. Defining $d_t$ (e.g., the depth at frame $I_t$) as the hidden state of the system 700, a belief volume is defined as $p(d_t|I_{1:t})$, which is the conditional distribution of the state given all previous frames in the sequence of image frames. In other words, the system 700 has a memory over the T frames from frame $I_1$ to $I_t$. Simple Bayesian filtering can be implemented over two steps.

In a prediction step, a predicted DPV for the next state $d_{t+1}$ can be calculated based on the current state. More specifically, the measured DPV 710 at time t is warped based on the relative camera pose information $\delta T_{t,t+1}$ at time t+1 compared to time t, as follows:

$$p(d_{t+1}|I_{1:t}) = \text{warp}(p(d_t|I_{1:t}), \delta T_{t,t+1}), \quad (\text{Eq. 7})$$

where the warp operator is implemented as a 3D grid sampling of the current measured DPV 710 for the reference frame 702-1 at time t. The warped version of the measured DPV 710 can be referred to as a predicted DPV.

In an update step, a measured DPV 710 for the next frame $I_{t+1}$ at time t+1 can be estimated by the system 700 using instances of the neural network 210 to extract features 204 for the image frames within the sliding window at time t+1. The hidden state $p(d_{t+1}|I_{1:t+1})$ is then updated based on this estimate of the measured DPV 710 at time t+1 and the predicted DPV, as follows:

$$p(d_{t+1}|I_{1:t+1}) = p(d_{t+1}|I_{1:t}) \cdot p(d_{t+1}|I_{1:t+1}), \quad (\text{Eq. 8})$$

The result of Equation 8 can be referred to as the updated DPV. It will be appreciated that the result of Equations 7 and 8 are always normalized such that the elements across each channel of the belief volume sum to one in order to represent probabilities. Equation 8 can be referred to as integration by applying Bayesian filtering with no damping.

Figure 10:
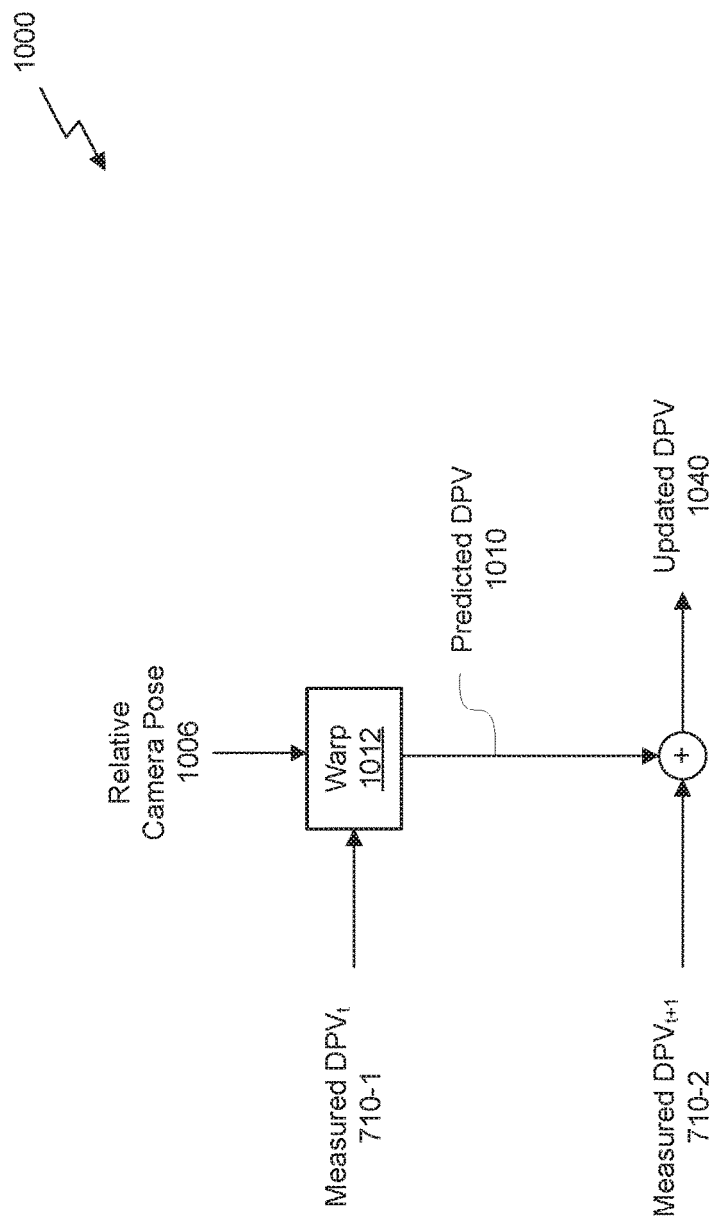
FIG. 10 illustrates a system for integrating measured DPVs over time to reduce uncertainty, in accordance with an embodiment.

FIG. 10 illustrates a system 1000 for integrating measured DPVs 710 over time to reduce uncertainty, in accordance with an embodiment. In a first step, a warp function 1012 generates the predicted DPV 1010 from a measured DPV 710-1 for a reference frame 702-1 in a sliding window 704 generated by the system 700 at a time t. The warp function 1012 is similar to the warp function 712. More specifically, the measured DPV 710-1 is warped to generate a predicted DPV 1010 for time t+1 based on relative camera pose information 1006.

In a second step, the predicted DPV 1010 is combined with a measured DPV 710-2 for a reference frame 702-1 in a sliding window 704 generated by the system 700 at a time t+1. The combination operation is performed by multiplying each element of the predicted DPV 1010 by a corresponding element of the measured DPV 710-2 and then normalizing the result.

One problem with directly applying Bayesian filtering is that both correct and incorrect information are propagated over time. Thus, artifacts such as specular highlights in one frame can propagate error introduced by the measured DPV 710 over multiple frames. In another example, occlusions or dis-occlusions could cause the estimated depth at object boundaries to change abruptly from frame to frame. One solution is to utilize damping to reduce the weight of the predicted DPV 1010 to reduce the propagation of incorrect information from previous frames.

Figure 11:
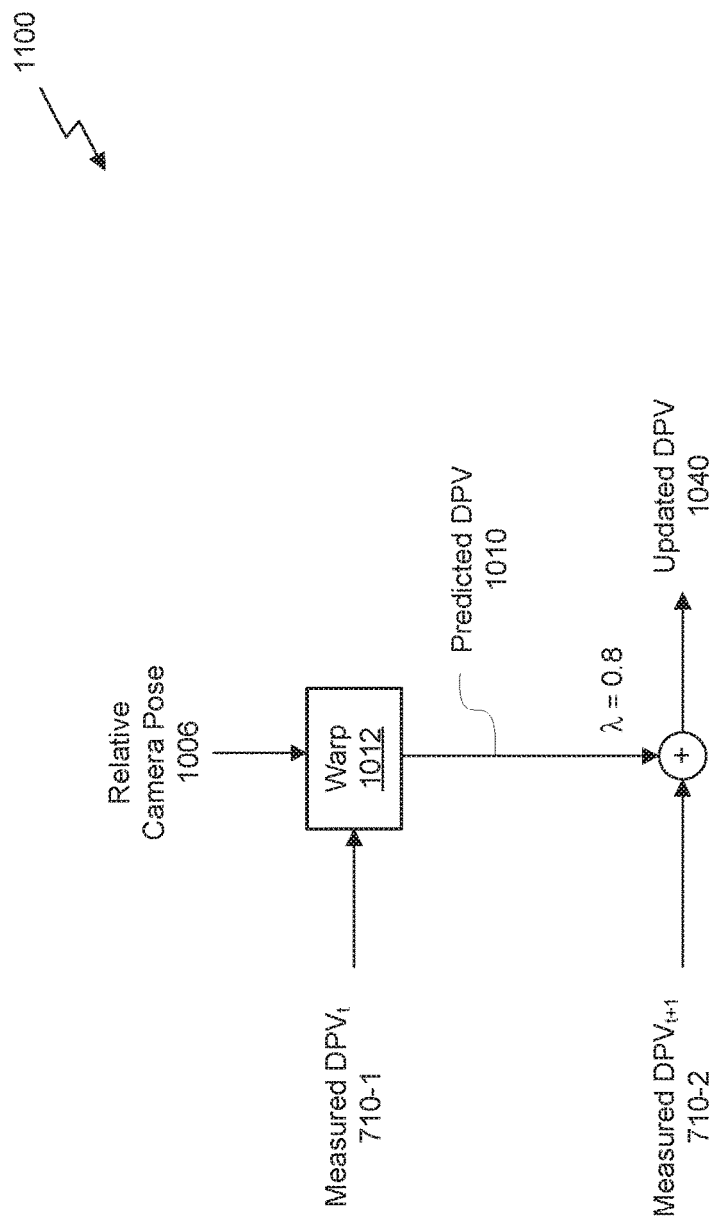
FIG. 11 illustrates a system for integrating measured DPVs over time to reduce uncertainty utilizing a global damping technique, in accordance with another embodiment.

FIG. 11 illustrates a system 1100 for integrating measured DPVs 710 over time to reduce uncertainty utilizing a global damping technique, in accordance with another embodiment. The system 1100 is similar to system 1000 except that the combination operation utilizes a global damping parameter (e.g., λ=0.8) to damp the effects of the predicted DPV 1010 on the output of the updated DPV 1040. More specifically, by defining E(d)=−log p(d), Equation 8 can be rewritten as:

$$E(d_{t+1}|I_{1:t+1}) = E(d_{t+1}|I_{1:t}) + E(d_{t+1}|I_{t+1}) \quad \text{(Eq. 9)}$$

where the first term on the right side of the Equation is related to the predicted DPV 1010 and the second term on the right side of the Equation is related to the measured DPV 710-2. Global damping can then be applied to Equation 9 by multiplying the first term by the global damping parameter, as follows:

$$E(d_{t+1}|I_{1:t+1}) = \lambda \cdot E(d_{t+1}|I_{1:t}) + E(d_{t+1}|I_{t+1}), \quad \text{(Eq. 10)}$$

However, while global damping helps reduce the error from incorrect values in the predicted DPV 1010 due to, e.g., occlusions or dis-occlusions, global damping also prevents some correct depth information from propagating to the hidden state for the next frame. Therefore, a solution referred to as adaptive damping is proposed.

Figure 12:
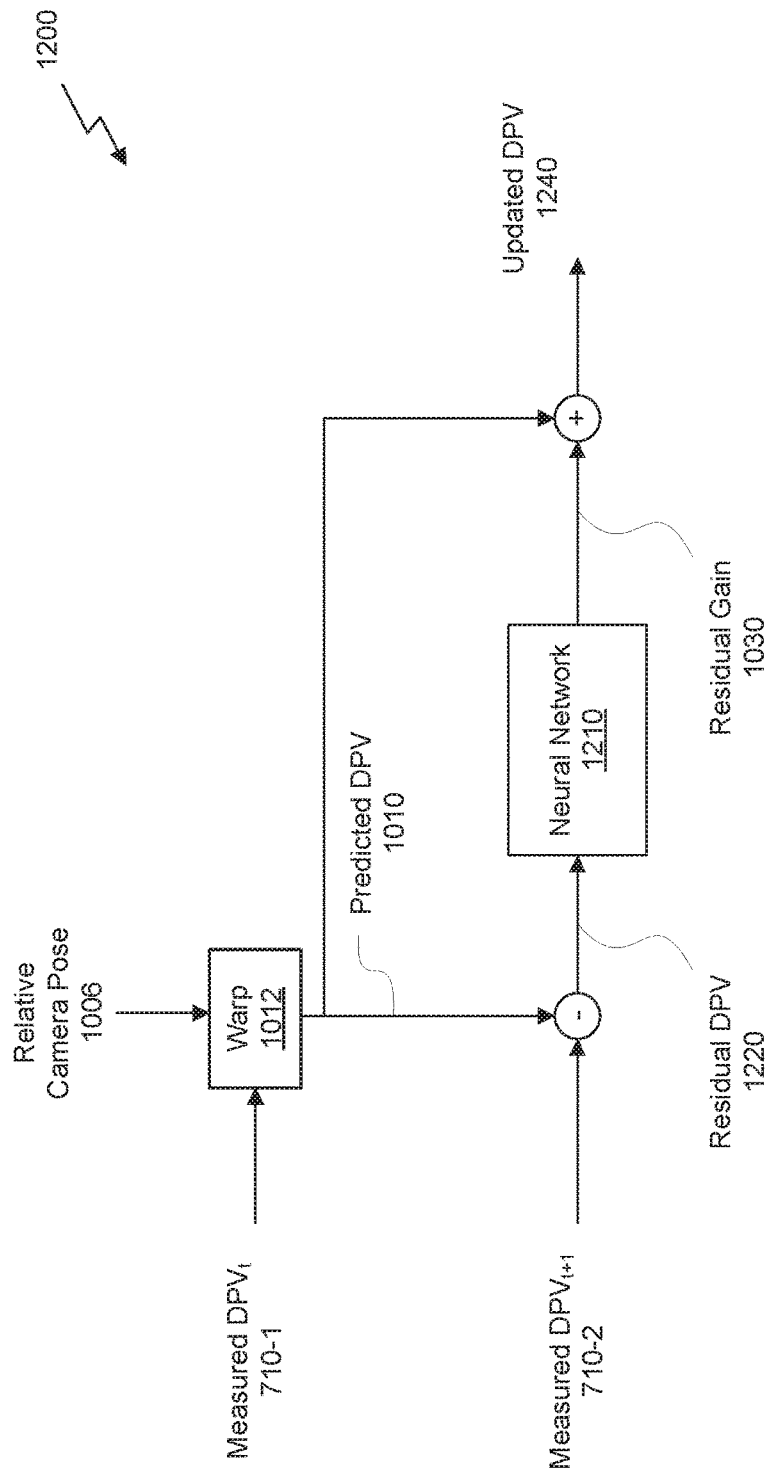
FIG. 12 illustrates a system for integrating measured DPVs over time to reduce uncertainty utilizing an adaptive damping technique, in accordance with yet another embodiment.

FIG. 12 illustrates a system 1200 for integrating measured DPVs 710 over time to reduce uncertainty utilizing an adaptive damping technique, in accordance with yet another embodiment. In contrast with the systems 1000 and 1100, the system 1200 does not combine the predicted DPV 1010 and the measured DPV 710-2 directly, but instead the system 1200 calculates a difference between the predicted DPV 1010 and the measured DPV 710-2 to generate a residual DPV 1220. The residual DPV 1220 highlights those portions of the predicted DPV 1010 that may represent erroneous information, such as those probabilities for voxels near objects that may have moved from the frame at time t to the frame at time t+1.

In an embodiment, the residual DPV 1220 is provided as input to a second neural network 1210. The second neural network 1210 is configured to process the residual DPV 1220 and generate a residual gain volume 1230 that includes estimated per-pixel damping gains that are applied to the predicted DPV 1010 to generate the updated DPV 1240, in accordance with the following equation:

$$E(d_{t+1}|I_{1:t+1}) = E(d_{t+1}|I_{1:t}) + g(\Delta E_{t+1}, I_{1:t}), \quad \text{(Eq. 11)}$$

where $\Delta E_{t+1}$ refers to the residual DPV 1220 and g(•) refers to a CNN implemented by the second neural network 1210. In contrast to Equation 10, the updated DPV 1240 produced by the operation of Equation 11 is only dependent on the predicted DPV 1010 and estimated correction factors produced by the second neural network 1210 based on the residual DPV 1220 and is not directly calculated from the measured DPV 710-2 generated by system 700.

In an embodiment, the second neural network 1210 is closely related to a Kalman filter, where, given an observation $x_t$ at time t and the hidden state $h_{t-1}$ at time t−1, the updated hidden state is:

$$h_t = W_t h_{t-1} + K_t V_t (x_t - W_t h_{t-1}), \quad \text{(Eq. 12)}$$

where $W_t$ is a transition matrix mapping the previous hidden state to the current state; $K_t$ is a gain matrix mapping the residual in an observation space to the hidden state space; and $V_t$ is a measurement matrix mapping the estimation in the hidden state space back to the observation space. In comparison with system 1200, the sliding window 704 of image frames are equivalent to observation $x_t$, the negative-log depth probability volumes are equivalent to the hidden state $h_t$, the warp function 1012 is equivalent to the transition matrix $W_t$, and the second neural network 1210 is equivalent to the multiplication of the gain and measurement matrices $K_t V_t$.

In an embodiment, the second neural network 1210 is a CNN that includes a number of stages, each stage comprising one or more layers. An input to the second neural network 1210 is a four dimensional hypervolume that includes one channel comprising the residual DPV 1220 and three additional channels representing an expanded reference frame. More specifically, each channel representing the expanded reference frame includes information for a particular color channel of the reference frame (e.g., red, green, or blue channels) projected into a 3D volume matching the dimensions of the measured DPV for the reference frame. In other words, a 2D image representing the color information from the reference frame for a particular color channel is replicated n times (e.g., n equal to 64) to create a 3D volume that includes information for a particular color channel replicated at each depth. The combination of the 3D volumes for the three color channels of the image along with the residual DPV 1220 are included in the four channels of the 4D hypervolume.

In an embodiment, a first stage of the CNN includes a first convolution layer that receives a 4 channel input and applies a 3D convolution operation utilizing a 3×3 convolution kernel to generate a 32 channel output. As used herein, a 3D convolution operation is different from a 2D convolution operation because the elements of a particular channel of the output can comprise weighted portions of multiple channels of the input. The first convolution layer can be followed by an activation function, such as a ReLU, and a second convolution layer. The second convolution layer receives the 32 channel output of the ReLU following the first convolution layer and applies a 3D convolution operation utilizing a 3×3 convolution kernel to generate a 32 channel output (e.g., the same as the input). The second convolution layer can also be followed by an activation function, such as a ReLU.

In one embodiment, the dimensions of the input to the second neural network are H/4×W/4×64×4 and the dimensions of the output of the first stage are H/4×W/4×64×32. The first stage of the CNN is followed by a second stage of the CNN that includes a number of blocks. Each block includes a first convolution layer, followed by an activation function (e.g., ReLU), and a second convolution layer. In some embodiments, the second convolution layer is not followed by an activation function. Both of the first convolution layer and the second convolution layer in the block implement 3D convolution operations and maintain the same number of channels at the output as the number of channels at the input. The second stage effectively seeks to expand the receptive field of each element of the output of the second stage. The dimensions of the output of the second stage are H/4×W/4×64×32.

The second stage of the CNN is followed by a third stage of the CNN that includes a first convolution layer that receives a 32 channel input and applies a 3D convolution operation utilizing a 3×3 convolution kernel to generate a 32 channel output. The first convolution layer can be followed by an activation function, such as a ReLU, and a second convolution layer. The second convolution layer receives the 32 channel output of the ReLU following the first convolution layer and applies a 3D convolution operation utilizing a 3×3 convolution kernel to generate an output (e.g., a residual gain corresponding to each value of the predicted DPV 1010). The output of the second neural network 1210 has a dimension of H/4×W/4×64, which is the same as the predicted DPV 1010.

It will be appreciated that the updated DPV 1240 output by the system 1200 has a resolution, in pixel space, that is ¼ the resolution of the reference frame 702-1 in each dimension of the pixel space. Consequently, in some embodiments, the updated DPV 1240 is processed by a third neural network to generate a refined DPV that matches a resolution, in pixel space, of the reference frame 702-1.

Figure 13:
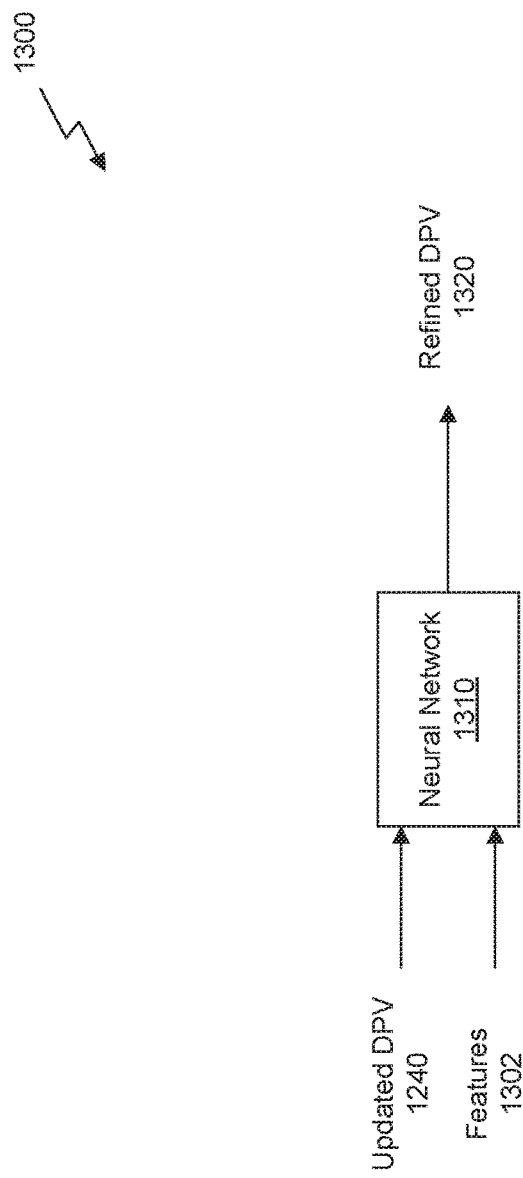
FIG. 13 illustrates a system for refining the updated DPV, in accordance with some embodiments.

FIG. 13 illustrates a system 1300 for refining the updated DPV 1240, in accordance with some embodiments. The system 1300 includes a third neural network 1310, which is a CNN, referred to as R-Net, that is configured to up-sample and refine the updated DPV 1240 back to an original image resolution of the reference frame 702-1. It will be appreciated that a CNN is implemented by the system 1300 rather than a simple interpolation operation, such as bi-linear interpolation, in order to further refine the results during the up-sampling operation rather than simply increasing the resolution in the pixel space. The third neural network 1310 is essentially a U-net with skip links that takes as input both the updated DPV 1240 from the system 1200 and features 1302 of the reference frame 702-1 extracted from the layers of the neural network 210. In an embodiment, the features 1302 include the output of the fusion layers 218 of the neural network 210.

In an embodiment, the third neural network 1310 includes a number of stages, each stage including a number of layers. The input to the third neural network 1310 is processed by a first convolution layer of the first stage of the CNN. The first convolution layer applies a convolution operation using a 3×3 convolution kernel, followed by an activation function such as a leaky ReLU. The output of the leaky ReLU is processed by a second convolution layer that applies a convolution operation using a 3×3 convolution kernel, followed by an activation function such as a leaky ReLU. The final layer in the first stage is a transposed convolution layer that applies a 4×4 convolution kernel to double the spatial resolution of the output of the first stage, in pixel space. The transposed convolution layer also reduces the number of channels of the output by half, generating an output of H/2×W/2×64.

The output of the first stage of the CNN is processed by a first convolution layer of the second stage of the CNN. The input to the second stage includes both the output of the first stage and the output of an intermediate layer of the convolution layers 212 of the neural network 210, which is included in the features 1302, and has dimensions of H/2×W/2×96. The first convolution layer applies a convolution operation using a 3×3 convolution kernel, followed by an activation function such as a leaky ReLU. The output of the leaky ReLU is processed by a second convolution layer that applies a convolution operation using a 3×3 convolution kernel, followed by an activation function such as a leaky ReLU. Neither the first convolution layer nor the second convolution layer change the dimensionality of the input to the second stage. The final layer in the second stage is a transposed convolution layer that applies a 4×4 convolution kernel to double the spatial resolution of the output of the second stage, in pixel space. The transposed convolution layer also reduces the number of channels of the output, generating an output of H×W×64.

The output of the second stage of the CNN is processed by a first convolution layer of the third stage of the CNN. The input to the third stage includes both the output of the second stage and the reference frame 702-1 provided as input to the neural network 210, which is included in the features 1302, and has dimensions of H×W×67. The first convolution layer applies a convolution operation using a 3×3 convolution kernel, followed by an activation function such as a leaky ReLU. The output of the leaky ReLU is processed by a second convolution layer that applies a convolution operation using a 3×3 convolution kernel, followed by an activation function such as a leaky ReLU. The second convolution layer reduces the number of channels from 67 to 64. The output of the leaky ReLU of the second convolution layer is processed by a third convolution layer that applies a convolution operation using a 3×3 convolution kernel to generate an output of the third neural network 1310 having dimensions of H×W×64, which is provided as the refined DPV 1320.

It will be appreciated that the skip links in the third neural network 1310 do not connect to the input or output of earlier stages of the third neural network 1310, as with traditional skip links, but instead are connected to features extracted from the neural network 210 utilized to process the reference frame 702-1, which are forwarded to the third neural network 1310 for processing as features 1302.

In summary, the entire system can include three separate sections, each section employing a different neural network for processing the data within that section. In a first section, the first neural network 210 processes a sequence of image frames 702 within a sliding window 704 to extract features 204 for each of the image frames 702. Features 204 for a number of source frames within the sliding window 704 can be warped and filtered with the features 204 for a reference frame 702-1 to generate a measured DPV 710. In a second section, the measured DPV 710 for a reference frame 702-1 and a predicted DPV 1010, based on a warped version of the measured DPV 710 for previous reference frame, are compared to generate a residual DPV 1220 that is processed by the second neural network 1210 to generate a residual gain volume 1030 that is combined with the predicted DPV 1010 to generate an updated DPV 1240. In a third section, the updated DPV 1240 is up-sampled using the third neural network 1310 to generate a refined DPV 1320 at an increased resolution. The refined DPV 1320 can be processed to generate an estimated depth map and a corresponding confidence map associated with the reference frame 702-1 within the sliding window 704. Video streams can be processed by repeating the steps after advancing the sliding window 704 one frame at a time as new frames are received.

Figure 14A:
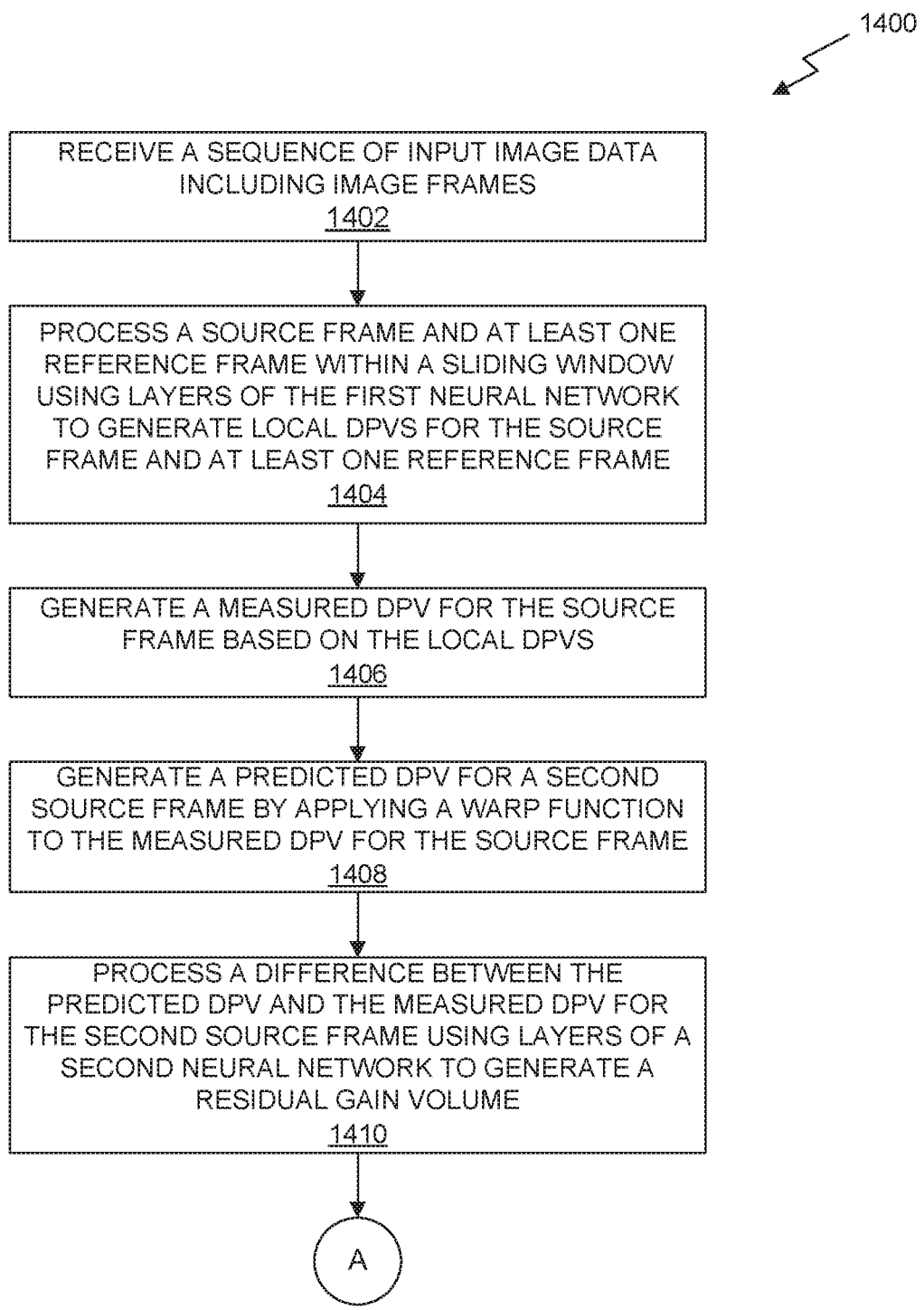
FIGS. 14A & 14B illustrate a flowchart of a method for estimating depth for a video stream captured using a monocular image sensor, in accordance with another embodiment.
Figure 14B:
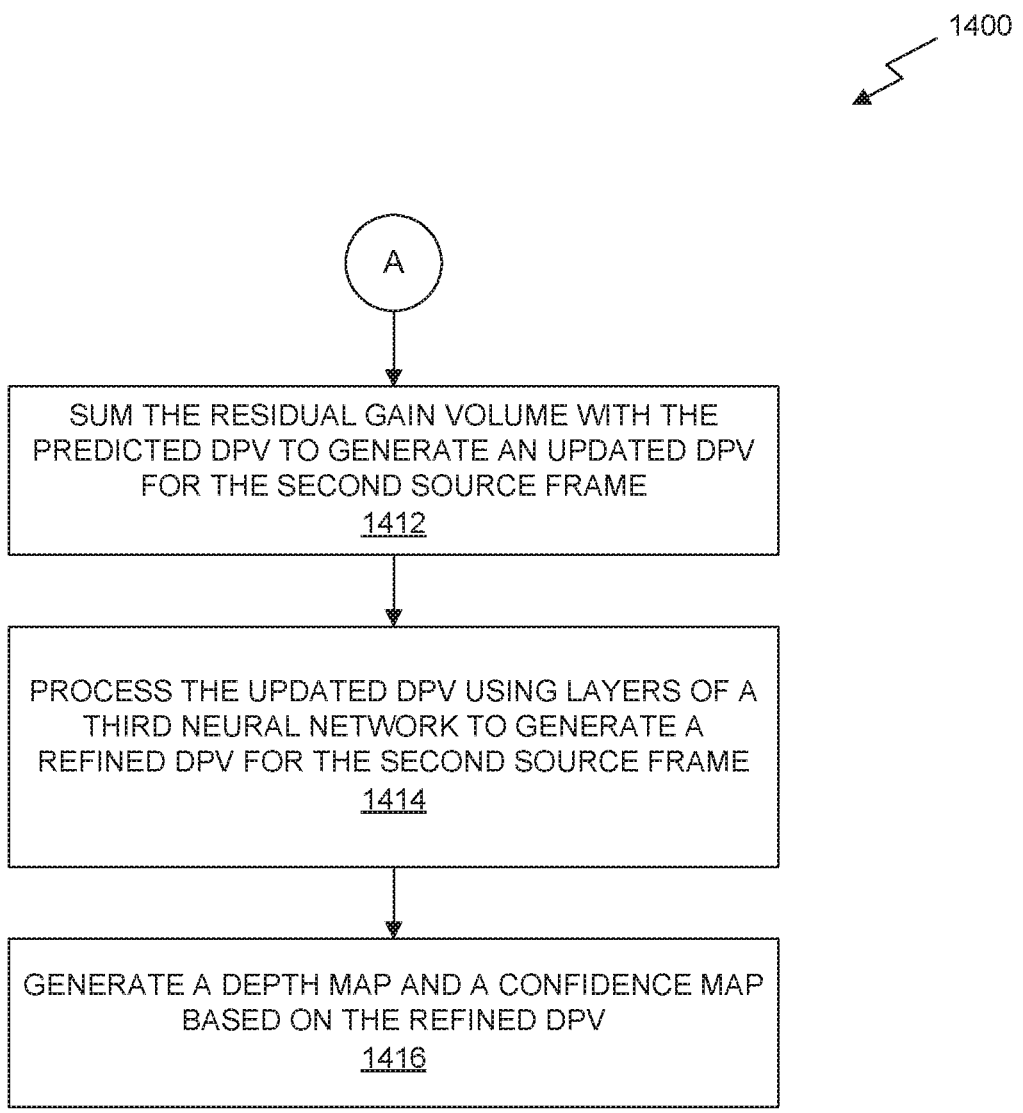

FIGS. 14A & 14B illustrate a flowchart of a method 1400 for estimating depth for a video stream captured using a monocular image sensor, in accordance with an embodiment. Although method 1400 is described in the context of a processing unit, the method 1400 may also be performed by a program, custom circuitry, or by a combination of custom circuitry and a program. For example, the method 1400 may be executed by a GPU (graphics processing unit), CPU (central processing unit), or any processor capable of estimating depth using a sequence of image frames. Furthermore, persons of ordinary skill in the art will understand that any system that performs method 1400 is within the scope and spirit of embodiments of the present disclosure.

At step 1402, a sequence of image data is received. The image data includes image frames included in a video stream captured by a monocular image sensor. The image data can be stored in a memory and read from the memory by a processor. Alternatively, the image data can be received via an interface from the monocular image sensor.

At step 1404, instances of a first neural network 210 process a reference frame 702-1 and at least one source frame within a sliding window 704 to extract features 204 for the reference frame 702-1 and at least one source frame in the sliding window 704.

At step 1406, a measured DPV 710 is generated for the reference frame 702-1 based on the features 204 for the reference frame 702-1 and at least one source frame in the sliding window 704. In an embodiment, the features 204 for the at least one source frame are warped, via a warp function, in accordance with relative camera pose information 706 associated with the at least one source frame.

At step 1408, for a sliding window 704 at time t+1, a predicted DPV 1010 for a second reference frame is generated by applying a warp function to the measured DPV 710 for the reference frame 702-1.

At step 1410, a residual DPV 1220 is processed using layers of a second neural network 1210 to generate a residual gain volume 1230. The residual DPV 1220 is a difference between the predicted DPV 1010 and the measured DPV 710 for the second reference frame.

At step 1412, the residual gain volume is summed with the predicted DPV 1010 to generate an updated DPV 1240 for the second reference frame.

At step 1414, the updated DPV 1240 is processed using layers of a third neural network 1310 to generate a refined DPV 1320 for the second reference frame.

At step 1416, a depth map and a confidence map are generated based on the refined DPV 1320. After step 1416, method 1400 can be repeated as additional image frames are received within the video stream.

It will be appreciated that more accurate depth estimation from a video stream captured by a monocular image sensor can be utilized in a variety of applications. For example, robotics can benefit greatly from more accurate estimation of depth without having to incorporate additional sensors such as depth sensors or multiple image sensors to capture stereoscopic images. In addition, autonomous vehicles can benefit from more accurate depth estimation in order to improve object avoidance algorithms. In yet another application, a user with a common smart phone with a single camera can capture and reconstruct a 3D model (e.g., a point cloud) simply by capturing a video of the environment around the user.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for estimating depth, the method comprising:
receiving a sequence of input image data including image frames of a scene;
processing a reference frame and at least one source frame included in the sequence of input image data within a window associated with the reference frame using layers of a first neural network to extract features for the reference frame and the at least one source frame within the window;
generating a measured depth probability volume (DPV) for the reference frame based on warped versions of the features for the at least one source frame and the features for the reference frame; and
generating a depth map and a confidence map based on the measured DPV, wherein the measured DPV includes a two-dimensional (2D) array of probability values for each of a plurality of candidate depth values.

2. The computer-implemented method of claim 1, wherein generating the measured DPV comprises:
applying a warp function to the features for each source frame in the at least one source frame to generate a warped version of the features for each source frame.

3. The computer-implemented method of claim 2, wherein the warp function, applied to the corresponding features for a particular source frame, is based on relative camera pose information related to a difference between a first position of an image sensor associated with the reference frame and a second position of the image sensor associated with the particular source frame.

4. The computer-implemented method of claim 2, wherein generating the measured DPV includes applying a softmax function, in the depth dimension, to a sum of differences between the features for the reference frame and a warped version of the features for each source frame of the at least one source frame.

5. The computer-implement method of claim 1, the method further comprising:
processing a second reference frame and at least one source frame included in the sequence of input image data within a second window associated with the second reference frame using layers of the first neural network to extract features for the second reference frame and the at least one source frame within the second window;
generating a measured DPV for the second reference frame based on the features for the second reference frame and warped versions of the features for the at least one source frame within the second window;
generating a predicted DPV for the second reference frame by applying a warp function to the measured DPV for the first reference frame; and
generating an updated DPV for the second reference frame based on the predicted DPV and the measured DPV for the second reference frame.

6. The computer-implemented method of claim 5, wherein generating the updated DPV for the second reference frame comprises:
multiplying the predicted DPV for the second reference frame by a weight to generate a weighted predicted DPV; and
combining the weighted predicted DPV with the measured DPV for the second reference frame.

7. The computer-implemented method of claim 5, wherein generating the updated DPV for the second reference frame comprises:
processing a difference between the predicted DPV and the measured DPV for the second reference frame using layers of a second neural network to generate a residual gain volume; and
summing the residual gain volume with the predicted DPV to generate the updated DPV.

8. The computer-implemented method of claim 7, the method further comprising processing the updated DPV for the second reference frame using layers of a third neural network to generate a refined DPV for the second reference frame, and wherein the depth map and the confidence map are calculated based on the refined DPV.

9. A system, comprising:
a memory storing a sequence of input image data including image frames; and
at least one processor communicatively coupled to the memory and configured to:
process a reference frame and at least one source frame included in the sequence of input image data within a window associated with the reference frame using layers of a first neural network to extract features for the reference frame and the at least one source frame within the window;
generate a measured depth probability volume (DPV) for the reference frame based on warped versions of the features for the at least one source frame and the features for the reference frame; and
generate a depth map and a confidence map based on the measured DPV,
wherein the measured DPV includes a two-dimensional (2D) array of probability values for each of a plurality of candidate depth values.

10. The system of claim 9, wherein the at least one processor is further configured to:
apply a warp function to the features for each source frame in the at least one source frame to generate a warped version of the features for each source frame.

11. The system of claim 10, further comprising:
an image sensor configured to capture the sequence of input image data,
wherein the warp function, applied to the features for a particular source frame, is based on relative camera pose information related to a difference between a first position of the image sensor associated with the reference frame and a second position of the image sensor associated with the particular source frame.

12. The system of claim 11, further comprising:
a positional sensing subsystem configured to generate the relative camera pose information.

13. The system of claim 12, wherein the positional sensing subsystem includes an inertial measurement unit (IMU).

14. The system of claim 10, wherein the at least one processor is further configured to apply a softmax function, in the depth dimension, to a sum of differences between the features for the reference frame and the warped version of the features for each source frame of the at least one source frame.

15. The system of claim 9, wherein the at least one processor is further configured to:
process a second reference frame and at least one source frame included in the sequence of input image data within a second window associated with the second reference frame using layers of the first neural network to extract features for the second reference frame and the at least one source frame within the second window;
generate a measured DPV for the second reference frame based on the features for the second reference frame and warped versions of the features for the at least one source frame within the second window;
generate a predicted DPV for the second reference frame by applying a warp function to the measured DPV for the first reference frame; and
generate an updated DPV for the second reference frame based on the predicted DPV and the measured DPV for the second reference frame.

16. The system of claim 15, wherein the at least one processor is further configured to:
multiply the predicted DPV for the second reference frame by a weight to generate a weighted predicted DPV; and combine the weighted predicted DPV with the measured DPV for the second reference frame.

17. The system of claim 15, wherein the at least one processor is further configured to:
process a difference between the predicted DPV and the measured DPV for the second reference frame using layers of a second neural network to generate a residual gain volume; and
sum the residual gain volume with the predicted DPV to generate the updated DPV.

18. The system of claim 17, wherein the at least one processor is further configured to process the updated DPV for the second reference frame using layers of a third neural network to generate a refined DPV for the second reference frame, and wherein the depth map and the confidence map are calculated based on the refined DPV.

19. A non-transitory computer-readable media storing computer instructions for estimating depth that, when executed by one or more processors, cause the one or more processors to perform the steps of:
receiving a sequence of input image data including image frames of a scene;
processing a reference frame and at least one source frame included in the sequence of input image data within a window associated with the reference frame using layers of a first neural network to extract features for the reference frame and the at least one source frame within the window;
generating a measured depth probability volume (DPV) for the source frame based on the features for the reference frame and the at least one source frame; and
generating a depth map and a confidence map based on the measured DPV,
wherein the measured DPV includes a two-dimensional (2D) array of probability values for each of a plurality of candidate depth values.

20. The non-transitory computer-readable media of claim 19, wherein the steps further include:
applying a warp function to the features for each source frame in the at least one source frame to generate a warped version of the features for each source frame.

* * * * *